(12) United States Patent
Akiyama et al.

(10) Patent No.: US 11,394,908 B2
(45) Date of Patent: Jul. 19, 2022

(54) IMAGING DEVICE AND IMAGING SYSTEM HAVING A CLIP CIRCUIT LIMITING A SIGNAL LEVEL OF AN OUTPUT LINE

(71) Applicant: CANON KABUSHIKI KAISHA, Tokyo (JP)

(72) Inventors: Takeshi Akiyama, Kanagawa (JP); Takanori Yamashita, Tokyo (JP); Takashi Fukuhara, Tokyo (JP); Takenori Kobuse, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/166,117

(22) Filed: Feb. 3, 2021

(65) Prior Publication Data

US 2021/0250532 A1 Aug. 12, 2021

(30) Foreign Application Priority Data

Feb. 10, 2020 (JP) .............................. JP2020-020641

(51) Int. Cl.
*H04N 5/363* (2011.01)
*H04N 5/378* (2011.01)
*H04N 5/3745* (2011.01)

(52) U.S. Cl.
CPC ............. *H04N 5/363* (2013.01); *H04N 5/378* (2013.01); *H04N 5/37457* (2013.01)

(58) Field of Classification Search
CPC ..... H04N 5/378; H04N 5/37457; H04N 5/363
See application file for complete search history.

(56) References Cited

U.S. PATENT DOCUMENTS

| 7,903,056 | B2 | 3/2011 | Kawasaki |
| 8,885,082 | B2 | 11/2014 | Noda |
| 9,118,857 | B2 | 8/2015 | Iwata |
| 9,432,607 | B2 | 8/2016 | Morita |
| 9,502,451 | B2 | 11/2016 | Yamashita |
| 9,653,498 | B2 | 5/2017 | Yamashita |
| 9,749,570 | B2 | 8/2017 | Yamashita |
| 10,051,223 | B2 | 8/2018 | Yamashita |
| 10,057,529 | B2 | 8/2018 | Saito |

(Continued)

FOREIGN PATENT DOCUMENTS

| JP | 2003-259233 A | 9/2003 |
| JP | 2008-136239 A | 6/2008 |

(Continued)

*Primary Examiner* — Nicholas G Giles
(74) *Attorney, Agent, or Firm* — Venable LLP

(57) ABSTRACT

An imaging device includes: pixels each including a photoelectric converter, and an output unit that outputs a pixel signal based on charge in a holding portion; an output line to which signals from the pixels are output; a clip circuit that limits a signal level of the output line to a range whose upper or lower limit is a predetermined clip level; and an amplifier unit that amplifies a signal of the output line. The amplifier unit outputs first and second signals amplified at first and second amplification factors, respectively, for the same pixel signal. The clip circuit limits a signal level of the output line to a first clip level in a first period in which the pixel signal is amplified at a first amplification factor and to a second clip level in a second period in which the pixel signal is amplified at a second amplification factor.

19 Claims, 13 Drawing Sheets

(56) References Cited

U.S. PATENT DOCUMENTS

| | | |
|---|---|---|
| 10,778,920 B2 | 9/2020 | Yamashita |
| 2008/0036890 A1* | 2/2008 | Yamashita .......... H04N 5/3598 |
| | | 348/308 |
| 2018/0063401 A1 | 3/2018 | Kobuse |
| 2019/0349540 A1 | 11/2019 | Yamashita |
| 2019/0379850 A1 | 12/2019 | Shinohara |
| 2020/0275037 A1 | 8/2020 | Fukuhara |
| 2020/0374481 A1 | 11/2020 | Yamashita |

FOREIGN PATENT DOCUMENTS

| | | |
|---|---|---|
| JP | 2009-296122 A | 12/2009 |
| JP | 2010-051029 A | 3/2010 |
| JP | 2014-140247 A | 7/2014 |

* cited by examiner

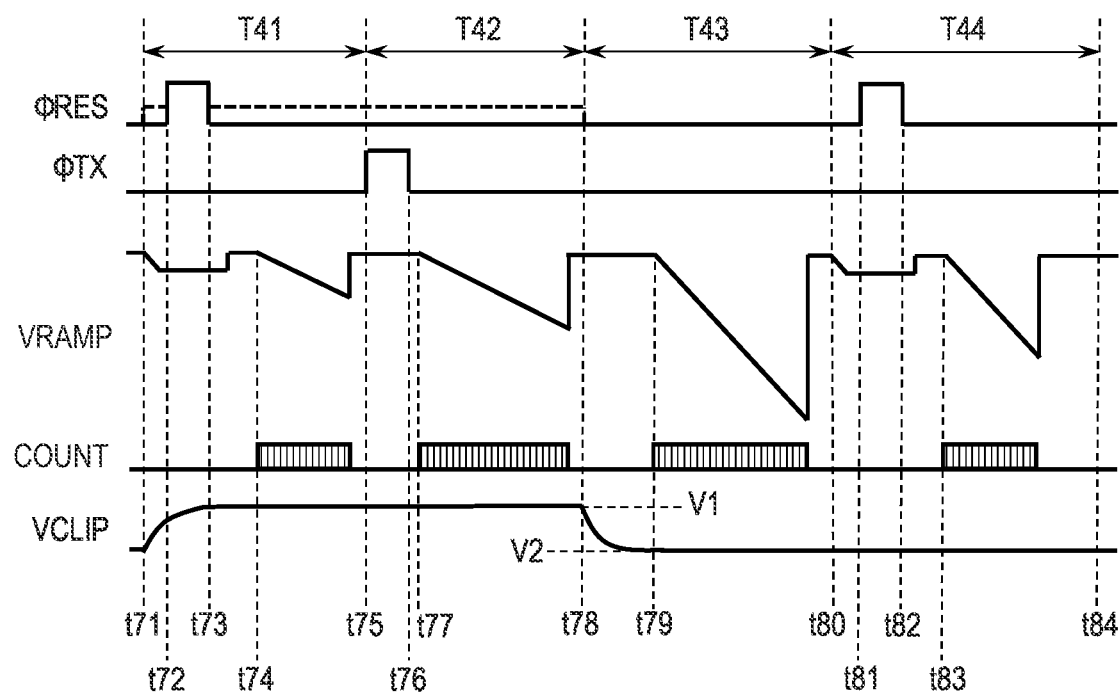

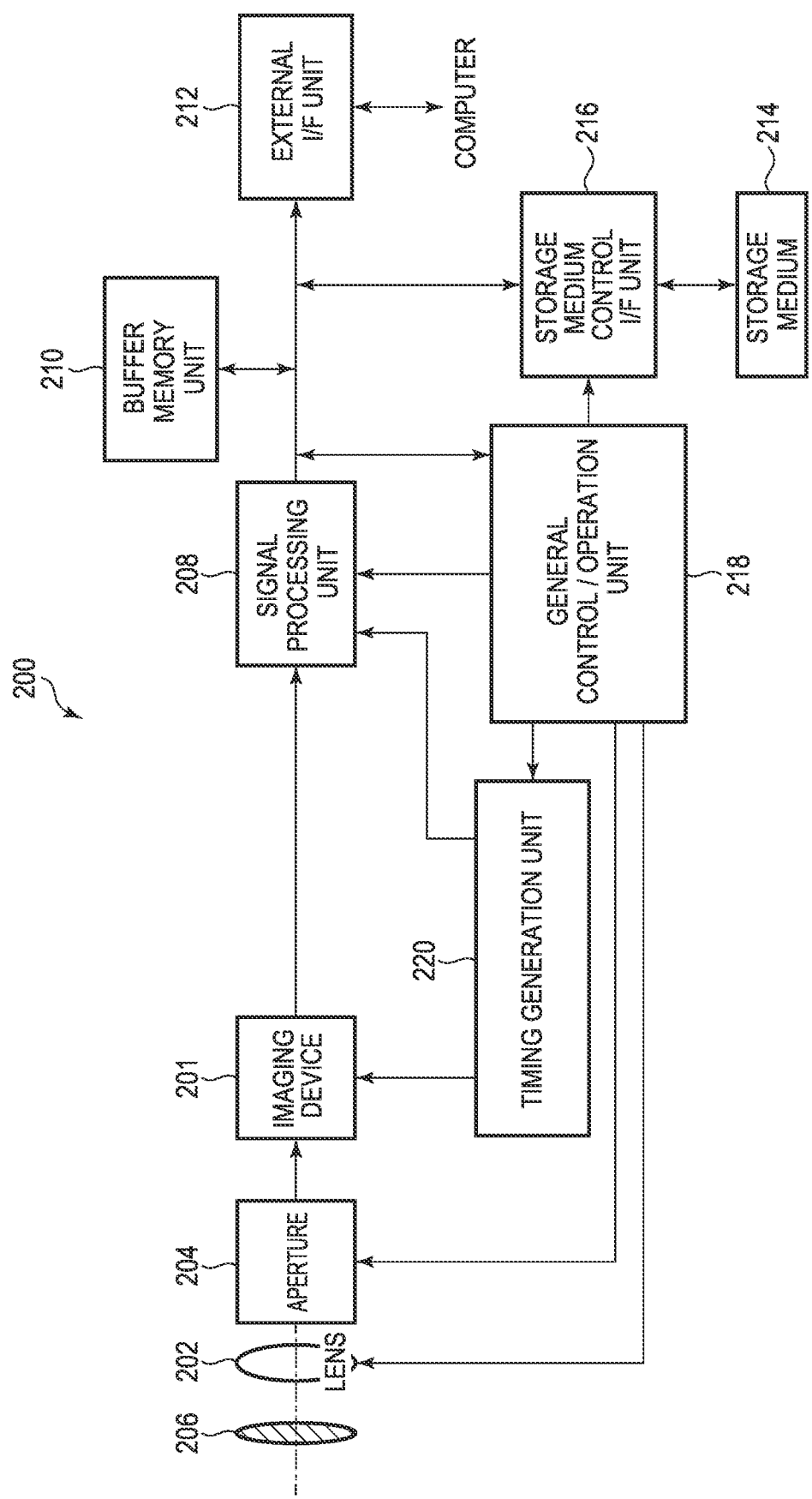

IMAGING DEVICE AND IMAGING SYSTEM HAVING A CLIP CIRCUIT LIMITING A SIGNAL LEVEL OF AN OUTPUT LINE

BACKGROUND OF THE INVENTION

Field of the Invention

The present invention relates to an imaging device and an imaging system.

Description of the Related Art

In imaging devices such as a CMOS image sensor, a phenomenon in which horizontal stripe noise occurs at incidence of high luminance light and deteriorates image quality is known. As a countermeasure against such horizontal stripe noise, Japanese Patent Application Laid-Open No. 2008-136239 discloses a technology to limit the potential of output lines connected to a plurality of pixels. Further, Japanese Patent Application Laid-Open No. 2009-296122 discloses a technology to limit the potential of output lines connected to a plurality of pixels in accordance with an amplification factor setting set to column amplifier units.

In recent imaging devices, a technology to realize a high dynamic range while maintaining concurrency by synthesizing two images obtained by amplifying the same pixel signal at different gains is known. This scheme is advantageous in that an image shift is less likely to occur compared to a scheme to generate a high dynamic range image by synthesizing two images obtained at different accumulation timings. However, if horizontal stripe noise occurs due to incidence of high luminance light, the level of horizontal stripe noise will differ between images processed at different amplification factors. As a result, two types of horizontal stripes appear in the synthesized image, and the image quality may rather be deteriorated.

SUMMARY OF THE INVENTION

The object of the present invention is to provide an imaging device and an imaging system that may suppress influence of horizontal stripe noise even at incidence of high luminance light and acquire a high quality image.

According to one aspect of the present invention, provided is an imaging device including a plurality of pixels each including a photoelectric converter that generates charge by photoelectric conversion, a holding portion that holds charge transferred from the photoelectric converter, and an output unit that outputs a pixel signal based on charge held by the holding portion, an output line that is connected to the plurality of pixels and to which signals from the plurality of pixels are output, a clip circuit that limits a signal level of the output line to a range whose upper limit or lower limit is a predetermined clip level, and an amplifier unit that amplifies a signal of the output line. In response to one pixel signal output from the pixel, the amplifier unit outputs a first signal amplified the one pixel signal at a first amplification factor and a second signal amplified the one pixel signal at a second amplification factor that is different from the first amplification factor, and the clip circuit limits a signal level of the output line to a first clip level in a first period in which the pixel signal is amplified at the first amplification factor and limits a signal level of the output line to a second clip level that is different from the first clip level in a second period in which the pixel signal is amplified at the second amplification factor.

Further, according to another aspect of the present invention, provided is an imaging device including a plurality of pixels each including a photoelectric converter that generates charge by photoelectric conversion, a holding portion that holds charge transferred from the photoelectric converter, and an output unit that outputs a pixel signal based on charge held by the holding portion, an output line that is connected to the plurality of pixels and to which signals from the plurality of pixels are output, a clip circuit that limits a signal level of the output line to a range whose upper limit or lower limit is a predetermined clip level, and an analog-to-digital (AD) conversion unit that performs AD conversion on a signal of the output line. In response to one pixel signal output from the pixels, the AD conversion unit outputs a first signal obtained by performing AD conversion on the one pixel signal at a first conversion gain and a second signal obtained by performing AD conversion on the one pixel signal at a second conversion gain that is different from the first conversion gain, and the clip circuit limits a signal level of the output line to a first clip level in a first period in which the pixel signal is converted by AD conversion into the first signal and a signal level of the output line to a second clip level that is different from the first clip level in a second period in which the pixel signal is converted by AD conversion into the second signal.

Further features of the present invention will become apparent from the following description of exemplary embodiments with reference to the attached drawings.

BRIEF DESCRIPTION OF THE DRAWINGS

FIG. 12 is a timing diagram illustrating a method of driving the imaging device according to the fourth embodiment of the present invention.

FIG. 13 is a block diagram illustrating a general configuration of an imaging system according to a fifth embodiment of the present invention.

DESCRIPTION OF THE EMBODIMENTS

Preferred embodiments of the present invention will now be described in detail in accordance with the accompanying drawings.

First Embodiment

Figure 1:
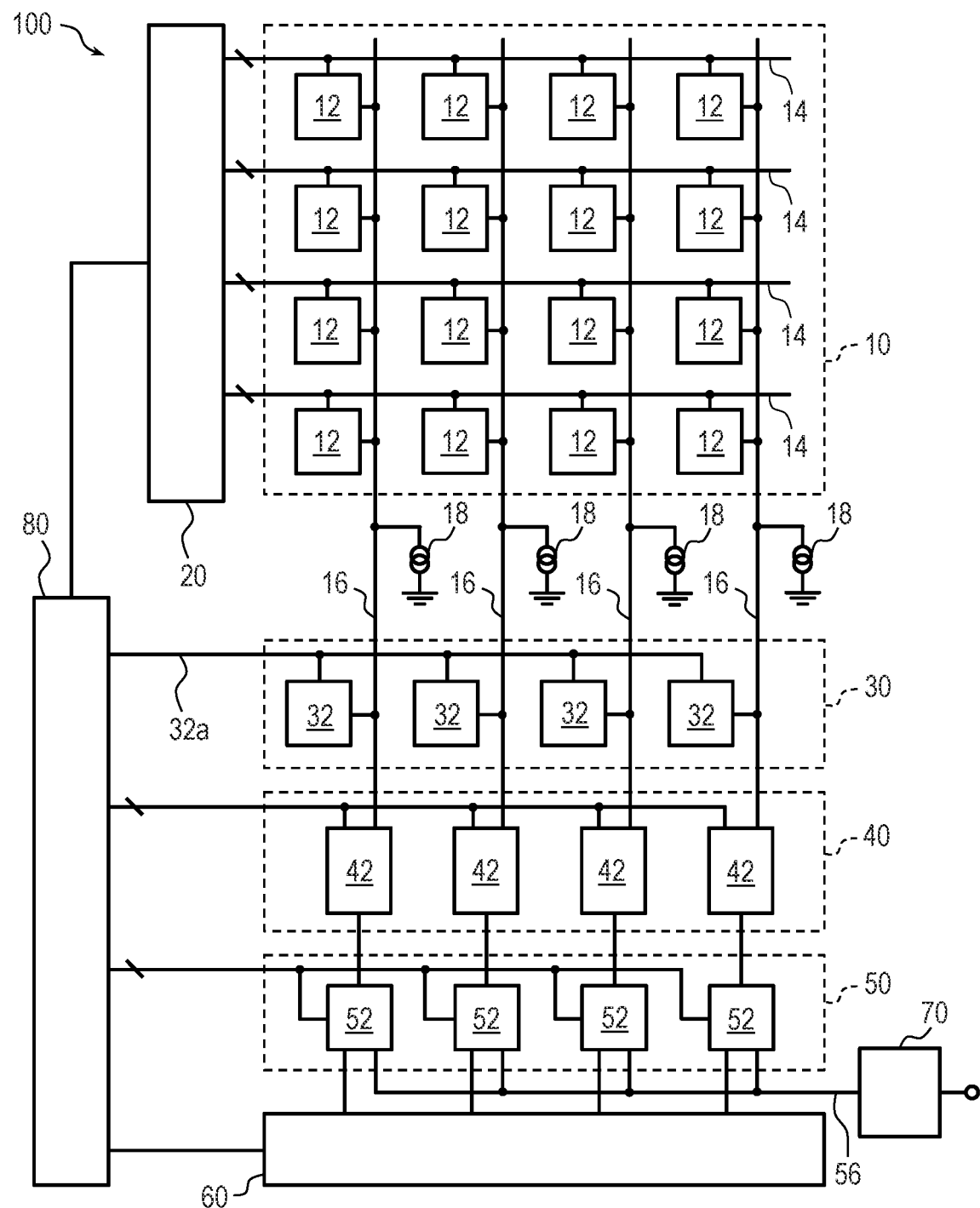
FIG. 1 is a block diagram illustrating a general configuration of an imaging device according to a first embodiment of the present invention.
Figure 2:
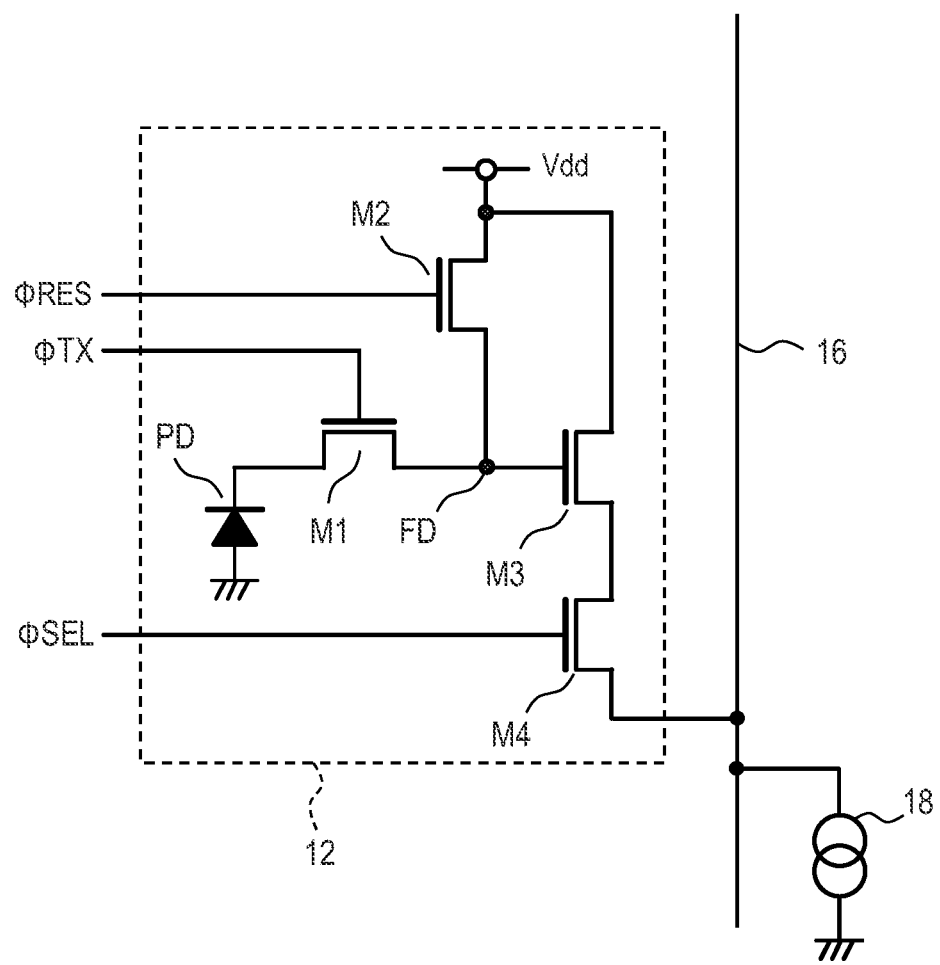
FIG. 2 is a circuit diagram illustrating a configuration example of a pixel in the imaging device according to the first embodiment of the present invention.
Figure 3:
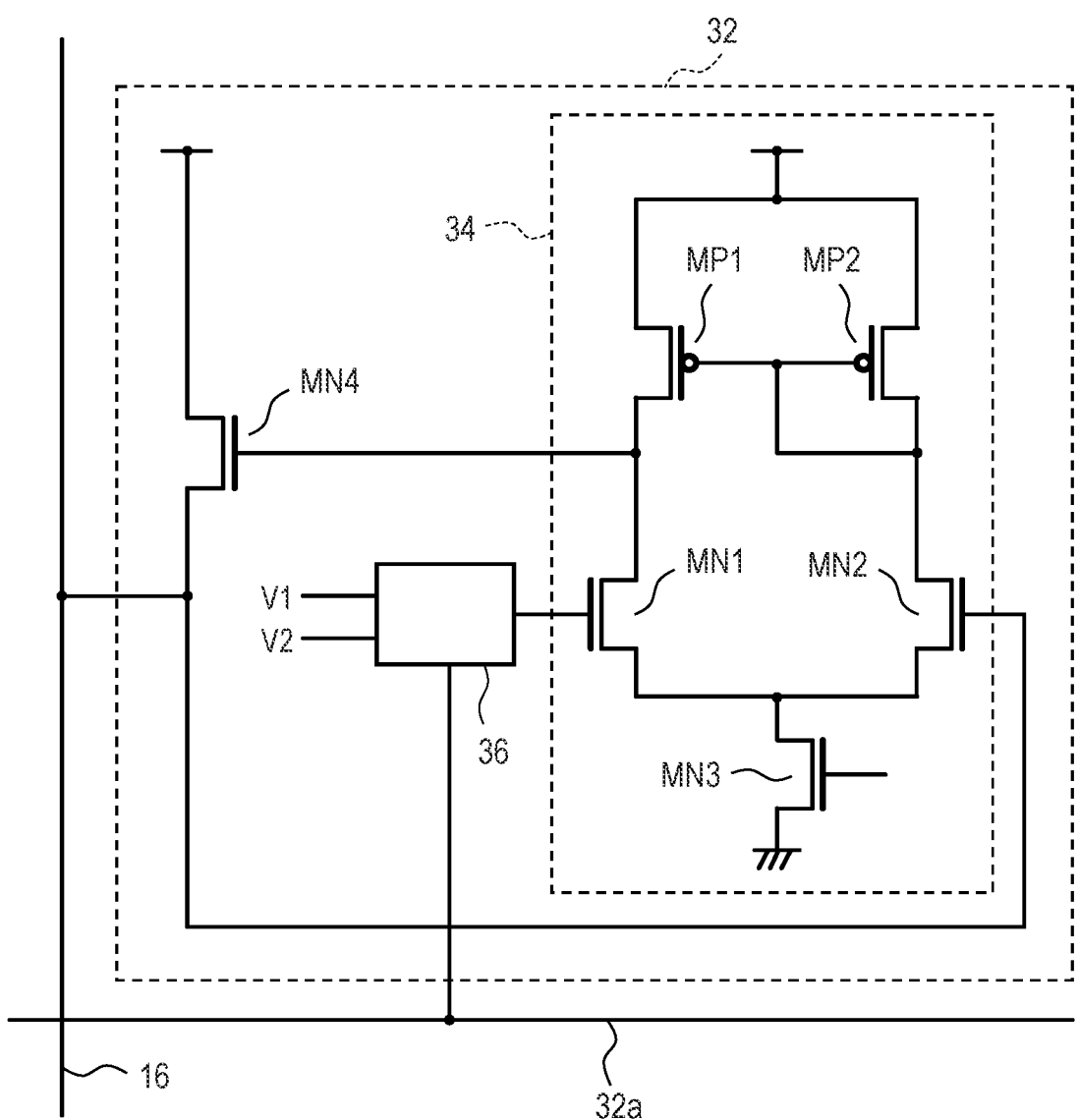
FIG. 3 is a circuit diagram illustrating a configuration example of a clip circuit in the imaging device according to the first embodiment of the present invention.
Figure 4:
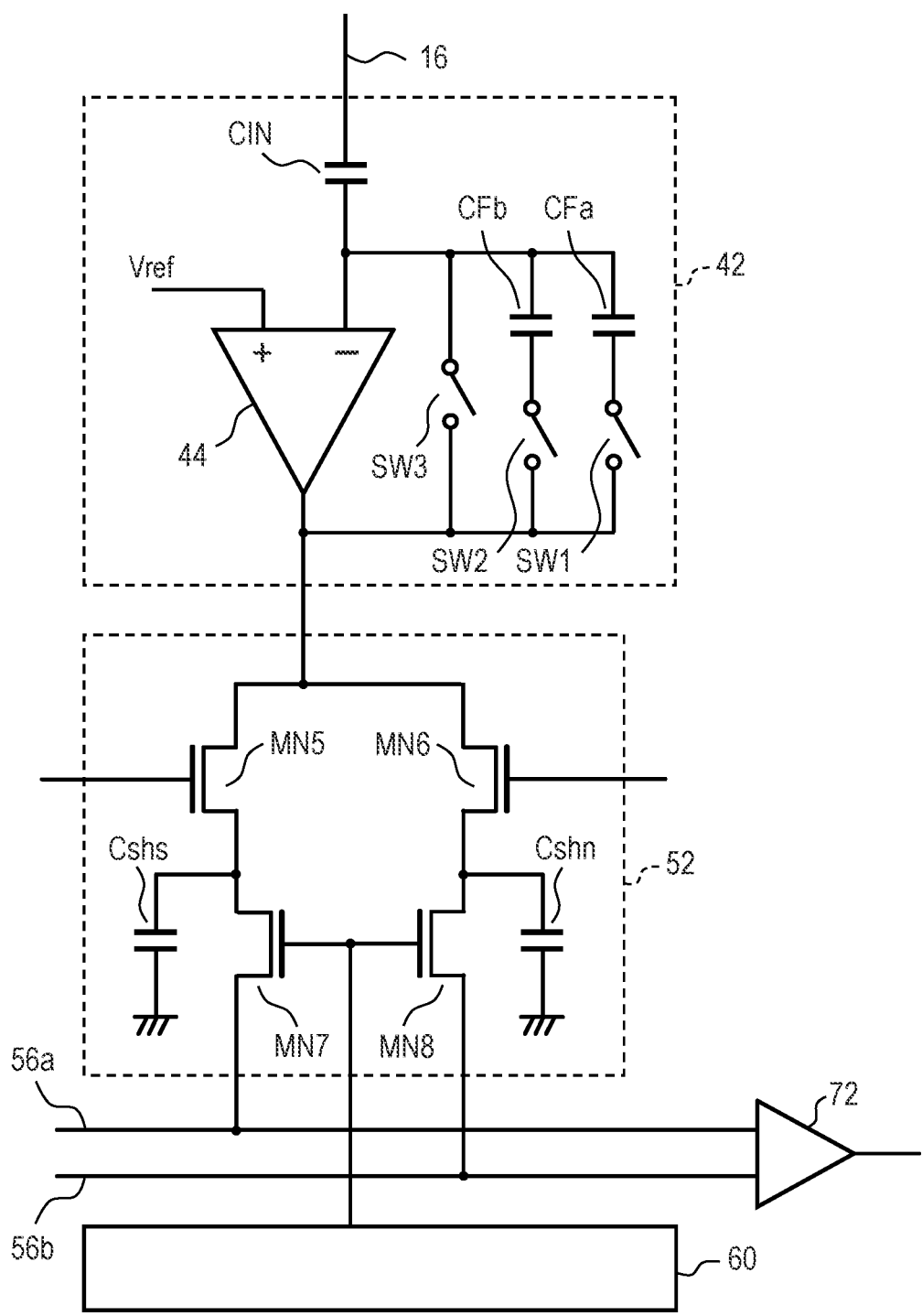
FIG. 4 is a circuit diagram illustrating a configuration example of a column readout circuit and a memory in the imaging device according to the first embodiment of the present invention.

A general configuration of an imaging device according to the present embodiment will be described with reference to FIG. 1 to FIG. 4. FIG. 1 is a block diagram illustrating the general configuration of the imaging device according to the present embodiment. FIG. 2 is a circuit diagram illustrating a configuration example of a pixel in the imaging device according to the present embodiment. FIG. 3 is a circuit diagram illustrating a configuration example of a clip circuit in the imaging device according to the present embodiment. FIG. 4 is a circuit diagram illustrating a configuration example of a column readout circuit and a memory in the imaging device according to the present embodiment.

As illustrated in FIG. 1, an imaging device 100 according to the present embodiment includes a pixel array unit 10, a vertical scanning circuit 20, a clip circuit unit 30, a readout circuit unit 40, a memory unit 50, a horizontal scanning circuit 60, an output circuit 70, and a control circuit 80.

In the pixel array unit 10, a plurality of pixels 12 arranged in a matrix over a plurality of rows and a plurality of columns are provided. Although FIG. 1 illustrates 16 pixels 12 arranged on four rows by four columns out of the pixels 12 forming the pixel array unit 10, the number of pixels 12 forming the pixel array unit 10 is not particularly limited.

On each row of the pixel array unit 10, a control line 14 is arranged extending in a first direction (horizontal direction in FIG. 1). Each of the control lines 14 is connected to the pixels 12 aligned in the first direction, respectively, to form a signal line common to these pixels 12. The first direction in which the control line 14 extends may be referred to as a row direction or the horizontal direction. The control lines 14 are connected to the vertical scanning circuit 20.

On each column of the pixel array unit 10, an output line 16 is arranged extending in a second direction (vertical direction in FIG. 1) crossing the first direction. Each of the output lines 16 is connected to the pixels 12 aligned in the second direction, respectively, to form a signal line common to these pixels 12. The second direction in which the output line 16 extends may be referred to as a column direction or the vertical direction. The output lines 16 are connected to the readout circuit unit 40. A current source 18 used for supplying bias current to readout circuits in the pixels 12 is connected to the output line 16.

The vertical scanning circuit 20 is a control circuit unit that supplies control signals to the pixels 12 via the control line 14 provided on each row of the pixel array unit 10, and the control signals are used for driving readout circuits in the pixels 12 when reading out signals from the pixels 12. The vertical scanning circuit 20 may be formed using a shift register or an address decoder.

The clip circuit unit 30 includes a plurality of clip circuits 32 corresponding to respective columns of the pixel array unit 10. The clip circuit 32 on each column is connected to the output line 16 on a corresponding column. Note that the specific configuration of the clip circuit 32 will be described later.

The readout circuit unit 40 is a function block that performs a predetermined process on a signal read out from the pixel array unit 10. The readout circuit unit 40 includes a plurality of column readout circuits 42 corresponding to respective columns of the pixel array unit 10. The column readout circuit 42 on each column is connected to the output line 16 on a corresponding column. Note that the specific configuration of the readout circuit unit 40 will be described later.

The memory unit 50 includes a plurality of memories 52 corresponding to respective columns of the pixel array unit 10. The memory 52 on each column holds a signal read out from the pixels 12 on a corresponding column via the readout circuit unit 40. A pixel signal held by the memory 52 on each column may be an analog pixel signal or may be digital data digitally converted from an analog pixel signal when the column readout circuit 42 includes an AD conversion circuit.

The horizontal scanning circuit 60 is a circuit unit that supplies control signals to the memories 52 on respective columns sequentially on a column basis, and the control signals are used for outputting pixel signals stored in the memories 52 on respective columns. Control lines of the horizontal scanning circuit 60 provided in association with respective columns of the pixel array unit 10 are connected to the memories 52 on corresponding columns. In response to receiving a control signal via the control line on a corresponding column of the horizontal scanning circuit 60, the memory 52 on each column outputs the held pixel signal to the output circuit 70 via the horizontal output line 56.

The output circuit 70 may include a signal processing unit that performs a process such as correlated double sampling (CDS) on a pixel signal read out from the memory 52 on each column. Further, the output circuit 70 may further include an external interface such as Low Voltage Differential Signaling (LVDS).

The control circuit 80 is a circuit unit that supplies control signals to the vertical scanning circuit 20, the clip circuit unit 30, the readout circuit unit 40, the memory unit 50, and the horizontal scanning circuit 60, and the control signals are used for controlling the operation of the above components and the timings thereof. At least some of these control signals may be supplied from the external of the imaging device 100.

Each of the pixels 12 may be formed of a photoelectric converter PD, a transfer transistor M1, a reset transistor M2, an amplifier transistor M3, and a select transistor M4, as illustrated in FIG. 2, for example.

The photoelectric converter PD is a photodiode, for example, the anode thereof is connected to a ground node, and the cathode thereof is connected to the source of the transfer transistor M1. The drain of the transfer transistor M1 is connected to the source of the reset transistor M2 and the gate of the amplifier transistor M3. The connection node of the drain of the transfer transistor M1, the source of the reset transistor M2, and the gate of the amplifier transistor M3 is a so-called floating diffusion portion FD. The floating diffusion portion FD includes a capacitance component (floating diffusion capacitance) and has a function as a charge holding portion.

The drain of the reset transistor M2 and the drain of the amplifier transistor M3 are connected to the power supply node to which a voltage Vdd is supplied. The source of the amplifier transistor M3 is connected to the drain of the select transistor M4. The source of the select transistor M4 is connected to the output line 16. The output line 16 is connected to the current source 18.

Note that the pixel 12 is not necessarily required to have the select transistor M4 and may have a pixel configuration not including the select transistor M4. In such a case, the source of the amplifier transistor M3 is connected to the output line 16.

In the case of the pixel configuration of FIG. 2, the control line 14 on each row arranged in the pixel array unit 10 includes signal lines TX, RES, and SEL. The signal line TX is connected to the gates of the transfer transistors M1 of the pixels 12 belonging to a corresponding row, respectively, to form a signal line common to these pixels 12. The signal line RES is connected to the gates of the reset transistors M2 of the pixels 12 belonging to a corresponding row, respectively, to form a signal line common to these pixels 12. The signal line SEL is connected to the gates of the select transistors M4 of the pixels 12 belonging to a corresponding row, respectively, to form a signal line common to these pixels 12.

A control signal ΦTX that is a drive pulse used for controlling the transfer transistor M1 is supplied to the signal line TX from the vertical scanning circuit 20. A control signal ΦRES that is a drive pulse used for controlling the reset transistor M2 is supplied to the signal line RES from the vertical scanning circuit 20. A control signal ΦSEL that is a drive pulse used for controlling the select transistor M4 is supplied to the signal line SEL from the vertical scanning circuit 20. When each transistor is formed of an n-channel transistor, a corresponding transistor is turned on in response to a control signal at a High level (hereafter, denoted as "H level") being supplied from the vertical scanning circuit 20. Further, a corresponding transistor is turned off in response to a control signal at a Low level (hereafter, denoted as "L level") being supplied from the vertical scanning circuit 20.

The photoelectric converter PD converts (photoelectrically converts) incident light into an amount of charge in accordance with the light amount and accumulates the generated charge. When turned on, the transfer transistor M1 transfers charge held by the photoelectric converter PD to the floating diffusion portion FD. The floating diffusion portion FD holds charge transferred from the photoelectric converter PD and has a voltage in accordance with the amount of the charge transferred from the photoelectric converter PD due to charge-voltage conversion caused by the capacitance of the floating diffusion portion FD. The amplifier transistor M3 is configured such that the voltage Vdd is supplied to the drain and bias current is supplied to the source from the current source 18 via the select transistor M4 and forms an amplifier unit (source follower circuit) whose gate is the input node. Accordingly, the amplifier transistor M3 outputs a signal based on the voltage of the floating diffusion portion FD to the output line 16 via the select transistor M4. In this sense, the amplifier transistor M3 also serves as an output unit that outputs a pixel signal based on charge held by the floating diffusion portion FD.

When turned on, the reset transistor M2 resets the floating diffusion portion FD to a voltage in accordance with the voltage Vdd.

The transfer transistor M1, the reset transistor M2, and the select transistor M4 of the pixel 12 are controlled on a row basis by the control signals ΦTX, ΦRES, and ΦSEL supplied from the vertical scanning circuit 20, as described above. Pixel signals of the pixels 12 belonging to a row selected by the control signal ΦSEL are simultaneously output to the output line 16 which respective pixels 12 correspond to.

Each clip circuit 32 is a circuit that limits (clips) the potential of the output line 16. That is, the clip circuit 32 limits the level of the output line 16 within a range whose upper limit or lower limit is a predetermined clip level. Each of the clip circuits 32 may be formed of a differential amplifier circuit 34, a VCLIP control circuit 36, and an n-channel transistor MN4, as illustrated in FIG. 3, for example. The differential amplifier circuit 34 may be formed of p-channel transistors MP1 and MP2 and n-channel transistors MN1, MN2, and MN3.

The source of the p-channel transistor MP1 and the source of the p-channel transistor MP2 are connected to the power supply node. The drain of the p-channel transistor MP1 is connected to the drain of the n-channel transistor MN1. The drain of the p-channel transistor MP2 is connected to the drain of the n-channel transistor MN2. The gate of the p-channel transistor MP1 and the gate of the p-channel transistor MP2 are connected to the connection node between the drain of the p-channel transistor MP2 and the drain of the n-channel transistor MN2. The source of the n-channel transistor MN1 and the source of the n-channel transistor MN2 are connected to the drain of the n-channel transistor MN3. The source of the n-channel transistor MN3 is connected to the ground node.

The gate of the n-channel transistor MN1 forms a non-inverting input node of the differential amplifier circuit 34, and the gate of the n-channel transistor MN2 forms an inverting input node of the differential amplifier circuit 34. Further, the connection node between the drain of the p-channel transistor MP1 and the drain of the n-channel transistor MN1 forms the output node of the differential amplifier circuit 34.

The VCLIP control circuit 36 is connected to the non-inverting input node of the differential amplifier circuit 34. The VCLIP control circuit 36 is configured to supply one of the voltages selected from a voltage V1 and a voltage V2 to the non-inverting input node of the differential amplifier circuit 34. Herein, the voltage V1 is a higher voltage than the voltage V2.

The drain of the n-channel transistor MN4 is connected to the power supply node. The source of the n-channel transistor MN4 is connected to the output line 16 and the inverting input node of the differential amplifier circuit 34. The gate of the n-channel transistor MN4 is connected to the output node of the differential amplifier circuit 34.

The VCLIP control circuit 36 outputs either one of the voltage V1 and the voltage V2 selectively in accordance with a control signal supplied from the control circuit 80 via a control line 32a and supplies the selected one to the non-inverting input terminal of the differential amplifier circuit 34. The potential of the output line 16 is supplied to the inverting input terminal of the differential amplifier circuit 34. The output of the differential amplifier circuit 34 is input to the gate of the n-channel transistor MN4. Accordingly, the clip circuit 32 can limit (clip) the potential of the output line 16 to a potential in accordance with the voltage V1 or the voltage V2.

For example, it is assumed that the voltage V1 is selected by the VCLIP control circuit 36 and supplied to the non-inverting input node of the differential amplifier circuit 34. At this time, in a state where the potential of the output line 16 is higher than the voltage V1, the potential of the output node of the differential amplifier circuit 34 is at a low value (L level) resulting in a stable state where the n-channel transistor MN4 is strongly turned off. Thus, the subthreshold current of the n-channel transistor MN4 is suppressed to be low. Once the potential of the output line 16 becomes lower than the voltage V1, the potential of the output node of the differential amplifier circuit 34 sharply rises in accordance with the gain of the differential amplifier circuit 34. Accordingly, the current flowing in the n-channel transistor MN4 increases resulting in a stable state where the voltage V1 and the potentials of the output line 16 (the output potential of the clip circuit 32), that is, the potential of the non-inverting input terminal and the potential of the inverting input terminal are the same. Accordingly, the lower limit value of the potential of the output line 16 is limited to the voltage V1. When the voltage V2 is selected by the VCLIP control circuit 36 and supplied to the non-inverting input node of the differential amplifier circuit 34, the potential of the output line 16 is limited to the voltage V2 by the same operation.

Note that the clip circuit 32 is not limited to the configuration illustrated in FIG. 3 as long as it is configured to be able to switch the clip potential of the output line 16.

Each of the column readout circuits 42 may be formed of an amplifier 44, capacitors CIN, CFa, and CFb, and switches SW1, SW2, and SW3, as illustrated in FIG. 4, for example. In the present embodiment, the column readout circuit 42 forms a column amplifier unit. The amplifier 44 may be formed of a differential amplifier circuit having the inverting input terminal (−), the non-inverting input terminal (+), and the output terminal. Since the potential of the output line 16 is reduced by the output of a pixel signal, an inverting amplifier circuit is often used for an amplifier circuit of the column readout circuit 42. In the present specification, each reference of the capacitors CIN, CFa, and CFb may denote the capacitance thereof.

The capacitor CIN is provided between the output line 16 and the inverting input terminal of the amplifier 44. Further, one of the electrodes of the capacitor CFa, one of the electrodes of the capacitor CFb, and one of the terminals of the switch SW3 are connected to the inverting input terminal of the amplifier 44. One of the terminals of the switch SW1 is connected to the other electrode of the capacitor CFa. One of the terminals of the switch SW2 is connected to the other electrode of the capacitor CFb. The other terminal of the switch SW1, the other terminal of the switch SW2, and the other terminal of the switch SW3 are connected to the output terminal of the amplifier 44. A voltage Vref is supplied to the non-inverting input terminal of the amplifier 44.

The connection states (conduction or non-conduction) of switches SW1, SW2, and SW3 are controlled by control signals ΦSW1, ΦSW2, and ΦSW3 supplied from the control circuit 80, respectively. For example, when a control signal ΦSWn is at the H level, a corresponding switch SWn is in an on-state (conduction state), and when the control signal ΦSWn is at the L level, the corresponding switch SWn is in an off-state (non-conduction state).

When turned on, the switch SW1 connects the inverting input terminal and the output terminal of the amplifier 44 to each other via the capacitor CFa. Further, when turned on, the switch SW2 connects the inverting input terminal and the output terminal of the amplifier 44 to each other via the capacitor CFb. That is, the capacitors CFa and CFb are negative feedback capacitors of the amplifier 44. When turned on, the switch SW3 short-circuits the inverting input terminal and the output terminal of the amplifier 44 to reset the amplifier 44. The capacitor CIN is an input capacitor of the amplifier 44.

The amplification factor of the amplifier 44 is expressed by the ratio (CIN/CF) of the input capacitance CIN and the negative feedback capacitance CF. Herein, the negative feedback capacitor CF is CFa+CFb when both the switches SW1 and SW2 are in the on-state, CF is CFa when the switch SW1 is in the on-state and the switch SW2 is in the off-state, and CF is CFb when the switch SW1 is in the off-state and the switch SW2 is in the on-state.

The capacitances of the capacitors CIN, CFa, and CFb can be set as appropriate in accordance with the amplification factor required for the amplifier circuit of the column readout circuit 42. For simplified illustration, it is assumed here that CFa <CFb and CIN=CFa+CFb. In such a case, when both the switches SW1 and SW2 are in the on-state, the amplification factor of the amplifier 44 is one-fold. When the switch SW1 is in the on-state and the switch SW2 is in the off-state, the amplification factor of the amplifier 44 is a first amplification factor (CIN/CFa) that is larger than 1. When the switch SW1 is in the off-state and the switch SW2 is in the on-state, the amplification factor of the amplifier 44 is a second amplification factor (CIN/CFb) that is larger than 1 and smaller than the first amplification factor.

For example, when the amplifier 44 is to be set to a high amplification factor, the amplification factor is set to CIN/CFa by turning on the switch SW1 and turning off the switch SW2. When the amplifier 44 is to be set to a low amplification factor, the amplification factor is set to CIN/(CFa+CFb) by turning on both the switch SW1 and the switch SW2. A larger capacitance difference between the capacitance CFa and the capacitance CFb results in a larger amplification factor.

In such a way, each pixel signal output from the output line 16 on each column is amplified by the column readout circuit 42 at two or more amplification factors different from each other. That is, the column readout circuit 42 outputs two or more signals amplified at different amplification factors for a single pixel signal.

Note that the column readout circuit 42 is not limited to the configuration illustrated in FIG. 4 as long as it includes at least an amplifier circuit that can switch an amplification factor. Further, the capacitances of the capacitors CIN, CFa, and CFb can be set as appropriate so that a desired amplification factor can be obtained. Further, the column readout circuit 42 may further include an AD conversion circuit that performs AD conversion on a signal amplified by the amplifier circuit.

Each of the memories 52 may be formed of n-channel transistors MN5, MN6, MN7, and MN8 and capacitors Cshs and Cshn, as illustrated in FIG. 4, for example.

The drain of the n-channel transistor MN5 and the drain of the n-channel transistor MN6 are connected to the output terminal of the amplifier 44. The source of the n-channel transistor MN5 is connected to the drain of the n-channel transistor MN7 and one of the electrodes of the capacitor Cshs. The source of the n-channel transistor MN7 is connected to a horizontal output line 56a. The source of the n-channel transistor MN6 is connected to the drain of the n-channel transistor MN8 and one of the electrodes of the capacitor Cshn. The source of the n-channel transistor MN8 is connected to a horizontal output line 56b. The gate of the n-channel transistor MN5 and the gate of the n-channel transistor MN6 are connected to the control circuit 80. The connection states (conduction or non-conduction) of the n-channel transistors MN5 and MN6 are controlled by control signals supplied from the control circuit 80. The gate of the n-channel transistor MN7 and the gate of the n-channel transistor MN8 are connected to the horizontal scanning circuit 60, and the connection states thereof (conduction or non-conduction) are controlled by control signals supplied from the horizontal scanning circuit 60. The horizontal output lines 56a and 56b are connected to a differential amplifier circuit 72.

When turned on, the n-channel transistor MN5 holds the output signal of the amplifier 44 in the capacitor Cshs. When turned on, the n-channel transistor MN7 outputs a pixel signal held by the capacitor Cshs to the horizontal output line 56a. Similarly, when turned on, the n-channel transistor MN6 holds the output signal of the amplifier 44 in the capacitor Cshn. When turned on, the n-channel transistor MN8 outputs a pixel signal held by the capacitor Cshn to the horizontal output line 56b.

The horizontal scanning circuit 60 supplies control signals sequentially on a column basis to the memory 52. The memory 52 on a column that receives a control signal from the horizontal scanning circuit 60 outputs pixel signals held by the capacitors Cshs and Cshn to the horizontal output lines 56a and 56b. The differential amplifier circuit 72 outputs a difference between a pixel signal output from the capacitor Cshs via the horizontal output line 56a (light detection signal) and a pixel signal output from the capacitor Cshn via the horizontal output line 56b (noise signal).

Note that the configuration on the downstream side of the readout circuit unit 40 is not limited to the configuration illustrated in FIG. 4 and can be changed as appropriate.

When high luminance light enters only some of the pixels 12 out of the plurality of pixels 12 arranged in two-dimensional array, the potential of the output lines 16 connected to the pixels which the high luminance light has entered is lower than the potential of the output lines 16 connected to the pixels 12 which the high luminance light have not entered. When the potential of the output line 16 is lower than a potential at which the current source 18 can operate, the amount of current flowing in the output line 16 also decreases. As a result, the current amount on each output line 16 connected to the pixels 12 which the high luminance light has entered differs from the current amount on each output line 16 connected to the pixels 12 which the high luminance light has not entered.

The current source 18 on each column forms a current mirror together with a master current source (not illustrated), and since the current amount of the current source 18 is defined by the current amount of the master current source, a change in the current amount of some of the output lines 16 causes a change in the current amount of other output lines 16. That is, a reduction in the potential of the output lines 16 connected to the pixels 12 which high luminance light has entered will cause a change in the current amount of the current sources 18 of the output lines 16 connected to the pixels 12 which the high luminance light has not entered. Thus, in comparison between a case where a signal is read out from a row on which high luminance light enters some of the pixels 12 and a case where a signal is read out from a row which does not include the pixels 12 which high luminance light enters, a difference occurs in the amount of current flowing in the output lines 16 and the output changes. Such a change in the output appears as horizontal stripe noise when viewed as an image, and this causes a reduction in image quality. Further, since a bias voltage line used for supplying the power supply voltage to the pixels 12 or the readout circuit unit 40 are shared and used by a plurality of columns, fluctuations of the power supply voltage may be caused by the same mechanism.

In recent imaging devices, a technology to generate an image with a high dynamic range while maintaining concurrency by synthesizing two images obtained by amplifying the same pixel signal at different gains is known. This scheme is beneficial in that an image shift is less likely to occur and this is advantageous in terms of image quality compared to a scheme to generate a high dynamic range image by synthesizing two images processed with different accumulation timings. On the other hand, when there is incidence of high luminance light, the level of horizontal stripe noise will differ between images processed at different amplification factors, and if these images are synthesized, two types of horizontal stripes appear in the synthesized image, and the image quality may rather be deteriorated.

As a countermeasure against horizontal stripe noise, a technology to set clip levels to the output lines and limit the potentials of the output lines is known. In such a case, to equalize horizontal stripe noise in an image processed at a high amplification factor to horizontal stripe noise in an image processed at a low amplification factor, it is required to set the clip level at the acquisition of an image processed at a high amplification factor to be higher than a clip level at acquisition of an image processed at a low amplification factor. However, if an image processed at a low amplification factor is output with a setting value of the clip level at acquisition of an image processed at a high amplification factor being maintained, the dynamic range will be significantly limited.

By using a drive method of the present embodiment illustrated below, it is possible to suppress influence of horizontal stripe noise even at incidence of high luminance light and acquire a high quality high dynamic range image.

Figure 5:
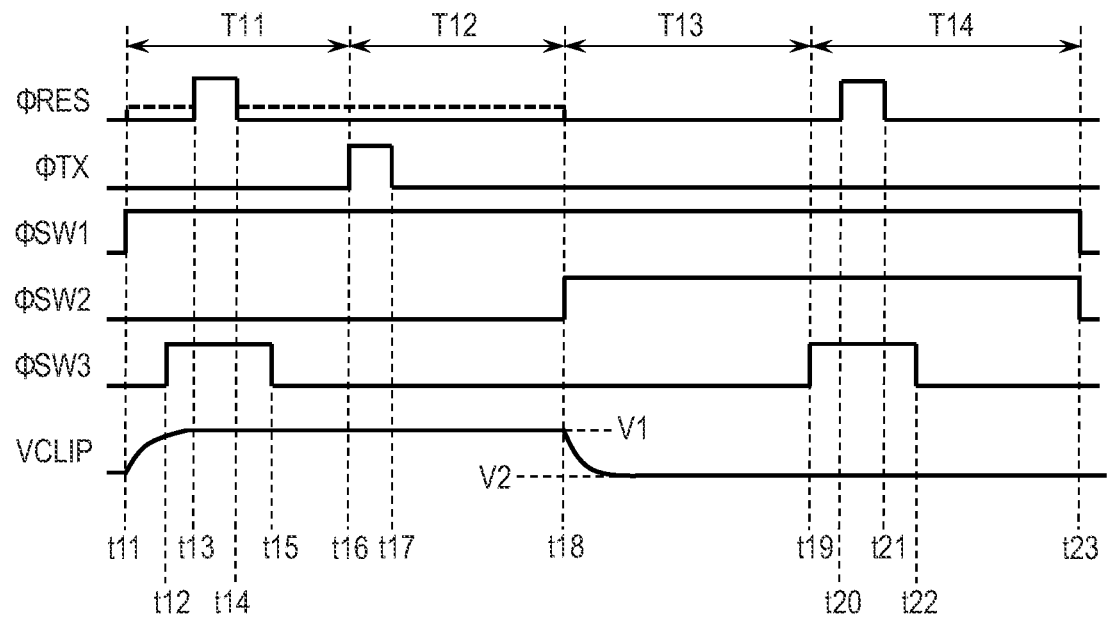
FIG. 5 is a timing diagram illustrating a method of driving the imaging device according to the first embodiment of the present invention.

Next, the method of driving the imaging device according to the present embodiment will be described with reference to FIG. 5. FIG. 5 is a timing diagram illustrating the method of driving the imaging device according to the present embodiment.

FIG. 5 illustrates the control signals ΦRES and ΦTX supplied to the pixels 12 on a particular row from the vertical scanning circuit 20 via the control line 14 and the control signals ΦSW1, ΦSW2, and ΦSW3 supplied to the column readout circuit 42 on each column of the readout circuit unit 40 among the control signals. Further, FIG. 5 illustrates a clip level VCLIP of the output line 16 limited by the clip circuit 32.

In FIG. 5, a period T11 (time t11 to time t16) is a readout period of a noise signal amplified at the first amplification factor (first noise signal). A period T12 (time t16 to time t18) is a readout period of a light detection signal amplified at the first amplification factor (first light detection signal). A period T13 (time t18 to time t19) is a readout period of a light detection signal amplified at the second amplification factor that is different from the first amplification factor (second light detection signal). A period T14 (time t19 to time t23) is a readout period of a noise signal amplified at the second amplification factor (second noise signal). In the present embodiment, signal readout is performed in the order of the first noise signal, the first light detection signal, the second light detection signal, and the second noise signal.

Herein, the first light detection signal and the second light detection signal are signals obtained by amplifying, at different amplification factors (the first amplification factor and the second amplification factor), a light detection signal based on charge generated by the photoelectric converter PD of the same pixel 12 in as the same exposure period. Further, the first noise signal and the second noise signal are signals obtained by amplifying, at a different amplification factor (the first amplification factor and the second amplification factor), a noise signal in accordance with the reset potential of the floating diffusion portion FD.

The differential amplifier circuit 72 generates a first signal obtained by subtracting the first noise signal from the first light detection signal and a second signal obtained by subtracting the second noise signal from the second light detection signal and outputs the first signal and the second signal to the external of the imaging device 100. A signal processing unit (not illustrated) outside the imaging device 100 synthesizes an image processed at a high amplification factor generated from the first signal and an image processed at a low amplification factor generated from the second signal to generate a high dynamic range image. Herein, the first signal and the second signal are signals obtained by amplifying, at different amplification factors, a signal based on charge generated by the photoelectric converter PD of the same pixel 12 in the same exposure period, as described previously. Therefore, by synthesizing an image processed at a high amplification factor generated from the first signal and an image processed at a low amplification factor generated from the second signal, it is possible to obtain a preferable high dynamic range image with less image shift.

In the period before time t11, the control signals ΦRES and ΦTX and the control signals ΦSW1, ΦSW2, and ΦSW3 on a row to be read out are at the L level. Further, although not illustrated in FIG. 5, the control signal ΦSEL on a row to be read out is at the H level from the period T11 to the period T14.

At time t11, the control circuit 80 controls the control signal ΦSW1 from the L level to the H level. Thereby, the switch SW1 is turned on, and the capacitance of the negative feedback capacitor CF of the amplifier 44 becomes CFa. Further, the amplification factor of the amplifier 44 is set to the first amplification factor expressed as CIN/CFa.

At the same time t11, the control circuit 80 controls the VCLIP control circuit 36 of the clip circuit 32 on each column and supplies the voltage V1 to the non-inverting input terminal of the differential amplifier circuit 34. Thereby, the lower limit value of the potential of the output line 16 is limited to the voltage V1.

Next, in the period from time t12 to time t15, the control circuit 80 controls the control signal ΦSW3 from the L level to the H level. Thereby, the switch SW3 is turned on, and the amplifier 44 is reset.

Next, in the period from time t13 to time t14, the vertical scanning circuit 20 controls the control signal ΦRES from the L level to the H level. Thereby, the reset transistor M2 is turned on, and the floating diffusion portion FD is reset to a predetermined potential in accordance with the voltage Vdd. A pixel signal in accordance with the reset potential of the floating diffusion portion FD (noise signal) is output to the output line 16.

The switch SW3 is turned off at time t15, and thereby the reset of the amplifier 44 is released. The noise signal output to the output line 16 is amplified at the first amplification factor and output from the amplifier 44.

Next, in the period from time t15 to time t16, the control circuit 80 supplies a H-level control signal to the n-channel transistor MN6 of the memory 52 on each column to turn on the n-channel transistor MN6. Thereby, a noise signal amplified at the first amplification factor (first noise signal) is held in the capacitor Cshn.

Next, in the period from time t16 to time t17, the vertical scanning circuit 20 controls the control signal ΦTX from the L level to the H level. Thereby, the transfer transistor M1 is turned on, signal charge accumulated in the photoelectric converter PD during a predetermined exposure period are transferred to the floating diffusion portion FD, and the potential of the floating diffusion portion FD decreases. Thereby, the potential of the output line 16 decreases to the potential in accordance with the amount of signal charge transferred to the floating diffusion portion FD. The potential of the output line 16 reduced in such a way corresponds to a pixel signal in accordance with the amount of signal charge (light detection signal).

At this time, since the clip circuit 32 is connected to the output line 16, even when high luminance light enters some of the pixels 12, the lower limit value of the potential of the output line 16 connected to these pixels 12 is limited to the voltage V1. Accordingly, it is possible to prevent the potential of the output line 16 from decreasing below the operable potential of the current source 18, and it is possible to suppress occurrence of horizontal stripe noise. The light detection signal output to the output line 16 is amplified at the first amplification factor and output from the amplifier 44.

Next, in the period from time t17 to time t18, the control circuit 80 supplies a H-level control signal to the n-channel transistor MN5 of the memory 52 on each column to turn on the n-channel transistor MN5. Thereby, a light detection signal amplified at the first amplification factor (first light detection signal) is held in the capacitor Cshs.

The horizontal scanning circuit 60 then supplies a H-level control signal to the n-channel transistors MN7 and MN8 to turn on the n-channel transistors MN7 and MN8. Thereby, the first light detection signal is output to the horizontal output line 56a, and the first noise signal is output to the horizontal output line 56b. The differential amplifier circuit 72 outputs a difference between the first light detection signal and the first noise signal as the first signal.

Next, at time t18, the control circuit 80 controls the control signal ΦSW2 from the L level to the H level. Thereby, the switch SW2 is turned on, and the capacitance of the negative feedback capacitor CF of the amplifier 44 becomes (CFa+CFb). Further, the amplification factor of the amplifier 44 becomes the second amplification factor expressed as CIN/(CFa+CFb).

At the same time t18, the control circuit 80 controls the VCLIP control circuit 36 of the clip circuit 32 on each column and switches the voltage to be supplied to the non-inverting input terminal of the differential amplifier circuit 34 from the voltage V1 to the voltage V2. Thereby, the lower limit value of the potential of the output line 16 is limited to the voltage V2. The light detection signal output to the output line 16 is amplified at the second amplification factor and output from the amplifier 44.

At this time, since the clip circuit 32 is connected to the output line 16, even when high luminance light enters some of the pixels 12, the lower limit value of the potential of the output line 16 connected to these pixels 12 is limited to the voltage V2. Accordingly, it is possible to prevent the potential of the output line 16 from decreasing below the operable potential of the current source 18, and it is possible to suppress occurrence of horizontal stripe noise.

Next, in the period from time t18 to time t19, the control circuit 80 supplies a H-level control signal to the n-channel transistor MN5 of the memory 52 on each column to turn on the n-channel transistor MN5. Thereby, a light detection signal amplified at the second amplification factor (second light detection signal) is held in the capacitor Cshs.

Next, in the period from time t19 to time t22, the control circuit 80 controls the control signal ΦSW3 from the L level to the H level. Thereby, the switch SW3 is turned on, and the differential amplifier circuit 34 is reset.

Next, in the period from time t20 to time t21, the vertical scanning circuit 20 controls the control signal ΦRES from the L level to the H level. Thereby, the reset transistor M2 is turned on, and the noise signal output to the output line 16 is amplified at the second amplification factor and output from the amplifier 44.

Next, in the period from time t22 to time t23, the control circuit 80 supplies a H-level control signal to the n-channel transistor MN6 to turn on the n-channel transistor MN6. Thereby, a noise signal amplified at the second amplification factor (second noise signal) is held in the capacitor Cshn.

The horizontal scanning circuit 60 then supplies a H-level control signal to the n-channel transistors MN7 and MN8 to turn on the n-channel transistors MN7 and MN8. Thereby, the second light detection signal is output to the horizontal output line 56a, and the second noise signal is output to the horizontal output line 56b. The differential amplifier circuit 72 outputs a difference between the second light detection signal and the second noise signal as the second signal.

Note that a noise signal superimposed on the second light detection signal obtained by amplifying a light detection signal at the second amplification factor and the second noise signal are different from each other. However, since a signal amplified at the second amplification factor that is lower than the first amplification factor is mainly used on the high luminance side after image synthesis, optical shot noise is dominant even if these noise signals differ from each other, and there is little influence on the image quality obtained after image synthesis.

By driving the imaging device in such a way, it is possible to realize a high quality synthesis image with less image shift while suppressing occurrence of horizontal stripe noise.

One of the conceivable measures to reduce horizontal stripe noise may be to set the L level of the control signal ΦRES to be supplied to the gate of the reset transistor M2 to a predetermined L level in accordance with the amplification factor of the amplifier circuit when switching the amplification factor of the amplifier circuit in the column readout circuit 42.

That is, the reset transistor M2 is turned on if the potential of the floating diffusion portion FD decreases and the gate-source voltage exceeds the threshold not only when a H-level control signal is supplied to the gate but also when a L-level control signal is supplied to the gate. Therefore, with such a setting of the L level of the control signal ΦRES, the reset transistor M2 can be turned on in response to the potential of the floating diffusion portion FD falling below a certain potential due to incidence of high luminance light, and an excessive drop of the potential of the floating diffusion portion FD can be suppressed. Since a signal in accordance with the potential of the floating diffusion portion FD is output to the output line 16 via the amplifier transistor M3, by limiting the lower limit value of the potential of the floating diffusion portion FD, it is possible to limit the lower limit value of the potential of the output line 16 together in response thereto. The use of the reset transistor M2 located on the upstream side of the clip circuit unit 30 to limit the potential of the output line 16 has an effect of reducing the occurrence probability of horizontal stripe noise due to a change in the current amount of the current source 18 and may still be an effective measure.

In using this scheme, it can be considered to set the L level of the control signal ΦRES in the period T11 and the period T12 to be higher than the L level of the control signal ΦRES in the period T13 and the period T14, as illustrated in the dotted line in FIG. 5, for example.

In terms of realizing a high quality synthesis image with less image shift, however, it is not preferable to perform driving to switch the L level of the control signal ΦRES. As described previously, it is desirable to generate the first light detection signal and the second light detection signal based on the same signal output to the output line 16. As illustrated in FIG. 5, for example, if the driving to switch the L level of the control signal ΦRES is performed at time t18, the potential of the floating diffusion portion FD fluctuates in response to a fluctuation of the gate potential of the reset transistor M2, and the potential of the output line 16 will thus fluctuate. As a result, it is no longer possible to generate the first light detection signal and the second light detection signal based on the same signal, and this leads to deterioration of image quality obtained after image synthesis. To obtain a high quality synthesis image, it is desirable to maintain the L level of the control signal ΦRES to be constant.

From such a point of view, the present embodiment does not perform driving to switch the L level of the control signal ΦRES but performs driving to switch the clip level of the output line 16. That is, occurrence of horizontal stripe noise is suppressed by setting a suitable clip level in association with each of the first amplification factor and the second amplification factor so that the potential of the output line 16 does not fall below the operable potential of the current source 18 even at incidence of high luminance light. Accordingly, it is possible to realize a high quality synthesis image with less image shift while suppressing occurrence of horizontal stripe noise.

As described above, according to the present embodiment, it is possible to suppress influence of horizontal stripe noise even at incidence of high luminance light and acquire a high quality image.

Second Embodiment

Figure 6:
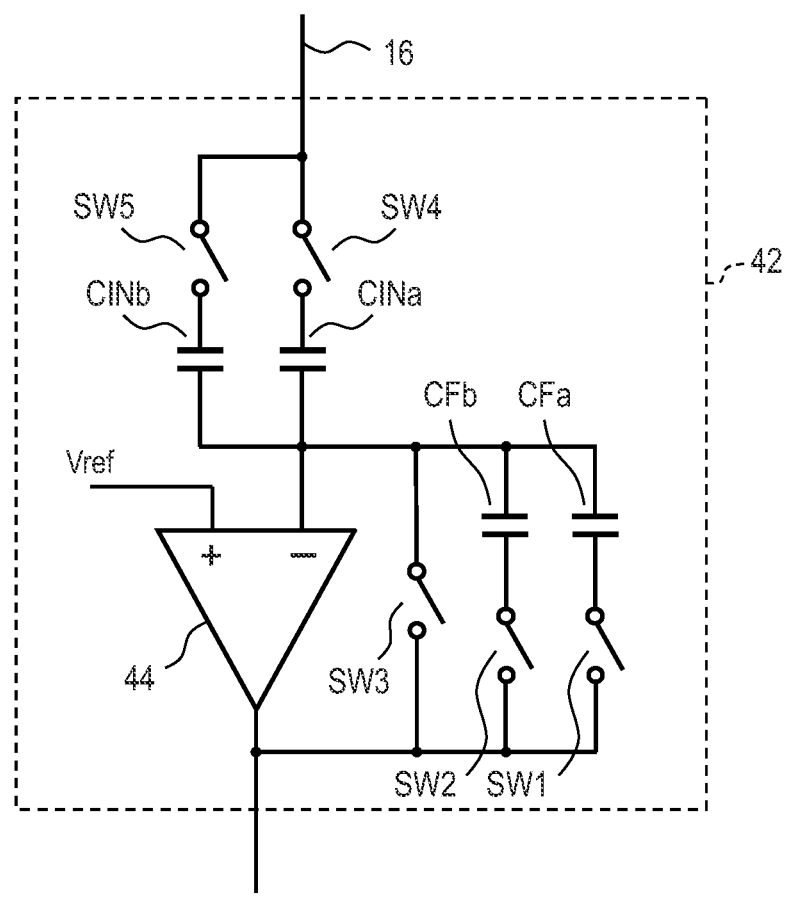
FIG. 6 is a circuit diagram illustrating a configuration example of a column readout circuit in an imaging device according to a second embodiment of the present invention.
Figure 7:
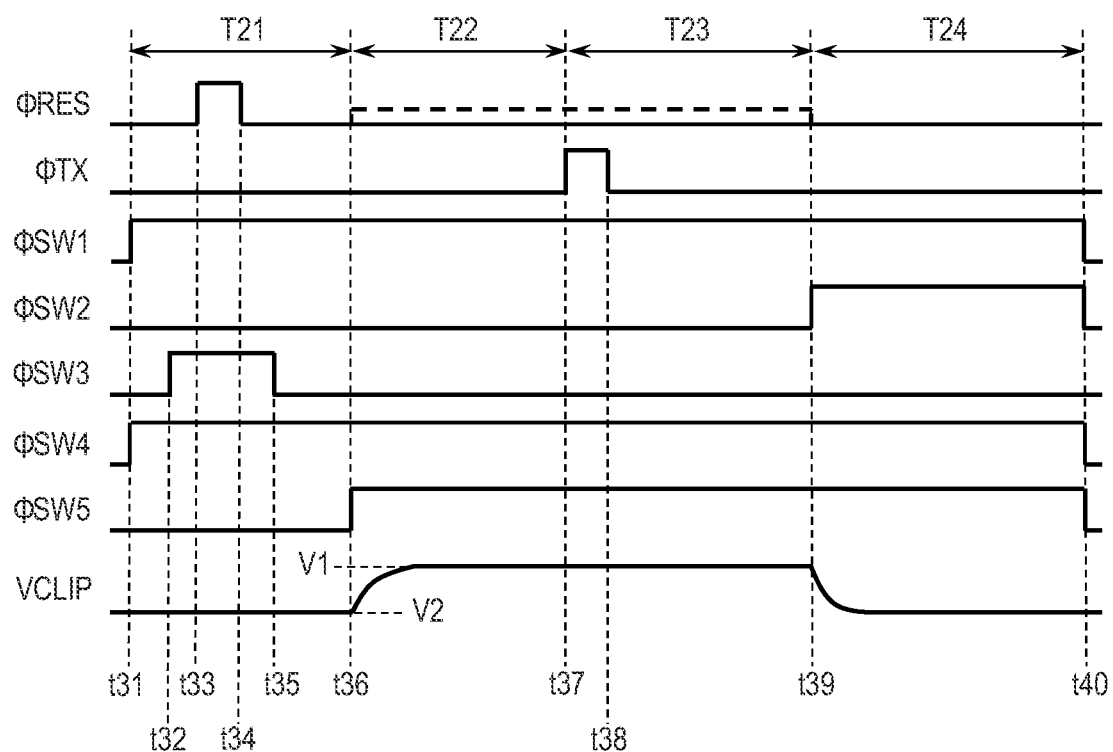
FIG. 7 is a timing diagram illustrating a method of driving the imaging device according to the second embodiment of the present invention.

An imaging device and a method of driving the same according to a second embodiment of the present invention will be described with reference to FIG. 6 and FIG. 7. The same components as those of the imaging device according to the first embodiment are labeled with the same references, and the description thereof will be omitted or simplified. FIG. 6 is a circuit diagram illustrating a configuration example of a readout circuit in the imaging device according to the present embodiment. FIG. 7 is a timing diagram illustrating a method of driving the imaging device according to the present embodiment.

The imaging device according to the present embodiment is the same as the imaging device according to the first embodiment except for a difference in the configuration of the column readout circuit 42. In the column readout circuit 42 of the imaging device according to the present embodiment, the capacitor CIN is replaced with a circuit formed of capacitors CINa and CINb and switches SW4 and SW5, as illustrated in FIG. 6. The remaining configuration of the column readout circuit 42 is the same as that of the column readout circuit 42 of the first embodiment illustrated in FIG. 4.

One of the electrodes of the capacitor CINa and one of the electrodes of the capacitor CINb are connected to the inverting input terminal of the amplifier 44. The other electrode of the capacitor CINa is connected to one of the terminals of the switch SW4. The other electrode of the capacitor CINb is connected to one of the terminals of the switch SW5. The other terminal of the switch SW4 and the other terminal of the switch SW5 are connected to the output line 16.

The connection states (conduction or non-conduction) of switches SW4 and SW5 are controlled by control signals ΦSW4 and ΦSW5 supplied from the control circuit 80, respectively. For example, when a control signal ΦSWn is at the H level, a corresponding switch SWn is in an on-state (conduction state), and when the control signal ΦSWn is at the L level, the corresponding switch SWn is in an off-state (non-conduction state).

When turned on, the switch SW4 connects the output line 16 and the inverting input terminal of the amplifier 44 to each other via the capacitor CINa. Further, when turned on, the switch SW5 connects the output line 16 and the inverting input terminal of the amplifier 44 to each other via the capacitor CINb. That is, the switches SW4 and SW5 are switches that select any one of a capacitance CINa, a capacitance CINb, and the combined capacitance of capacitances CINa and CINb as the input capacitor CIN that connects the output line 16 and the inverting input terminal of the amplifier 44 to each other.

The amplification factor of the amplifier 44 is expressed by the ratio (CIN/CF) of the input capacitance CIN and the negative feedback capacitance CF. Herein, the input capacitor CIN is CINa+CINb when both the switches SW4 and SW5 are in the on-state, CIN is CINa when the switch SW4 is in the on-state and the switch SW5 is in the off-state, and CIN is CINb when the switch SW4 is in the off-state and the switch SW5 is in the on-state.

The capacitances of the capacitors CINa and CINb can be set as appropriate in accordance with the amplification factor required for the amplifier circuit of the column readout circuit 42. For simplified illustration, it is assumed here that CINa<CINb, CFa <CFb, CINa=CFa, and CINa+CINb=CFa+CFb. When the amplification factor of the amplifier 44 is to be set to the first amplification factor that is the high amplification factor, the switches SW1, SW4, and SW5 are turned on, and the switch SW2 is turned off, for example. At this time, the amplification factor of the amplifier 44 becomes (CINa+CINb)/CFa. When the amplification factor of the amplifier 44 is to be set to the second amplification factor that is the low amplification factor, the switches SW1, SW2, SW4, and SW5 are turned on, for example. At this time, the amplification factor of the amplifier 44 becomes (CINa+CINb)/(CFa+CFb). Alternatively, the switches SW1 and SW4 are turned on, and the switches SW2 and SW5 are turned off. At this time, the amplification factor of the amplifier 44 becomes CINa/CFa. Alternatively, the switches SW1 and SW4 are turned off, and the switches SW2 and SW5 are turned on. At this time, the amplification factor of the amplifier 44 becomes CINb/CFb. A larger difference between the capacitance of the capacitor CINa and the capacitance of the capacitor CINb or a larger difference between the capacitance of the capacitor CFa and the capacitance of the capacitor CFb results in a larger amplification factor difference between the first amplification factors and the second amplification factors.

Next, the method of driving the imaging device according to the present embodiment will be described with reference to FIG. 7. FIG. 7 further illustrates the control signals ΦSW4 and ΦSW5 supplied to the column readout circuit 42 on each column of the readout circuit unit 40 in addition to the control signals ΦRES, ΦTX, ΦSW1, ΦSW2, and ΦSW3 and the clip level VCLIP illustrated in FIG. 5.

In FIG. 7, a period T21 (time t31 to time t36) is a readout period of a noise signal amplified at the second amplification factor (second noise signal). A period T22 (time t36 to time t37) is a readout period of a noise signal amplified at the first amplification factor (first noise signal). A period T23 (time t37 to time t39) is a readout period of a light detection signal amplified at the first amplification factor (first light detection signal). A period T24 (time t39 to time t40) is a readout period of a light detection signal amplified at the second amplification factor (second light detection signal). In the present embodiment, signal readout is performed in the order of the second noise signal, the first noise signal, the first light detection signal, and the second light detection signal. Note that, also in the present embodiment, the first amplification factor is higher than the second amplification factor.

In the period before time t31, the control signals ΦRES and ΦTX and the control signals ΦSW1, ΦSW2, ΦSW3, ΦSW4, and ΦSW5 on a row to be read out are at the L level. Further, the voltage supplied to the non-inverting input terminal of the differential amplifier circuit 34 from the VCLIP control circuit 36 of the clip circuit 32 on each column is the voltage V2. Further, although not illustrated in FIG. 7, the control signal ΦSEL on a row to be read out is at the H level from the period T21 to the period T24.

At time t31, the control circuit 80 controls the control signals ΦSW1 and ΦSW4 from the L level to the H level. Thereby, the switch SW1 is turned on, and the capacitance of the negative feedback capacitor CF of the amplifier 44 becomes CFa. Further, the switch SW4 is turned on, and the capacitance of the input capacitor CIN of the amplifier 44 becomes CINa. Thereby, the amplification factor of the amplifier 44 is set to the second amplification factor expressed as CINa/CFa.

Next, in the period from time t32 to time t35, the control circuit 80 controls the control signal ΦSW3 from the L level to the H level. Thereby, the switch SW3 is turned on, and the amplifier 44 is reset.

Next, in the period from time t33 to time t34, the vertical scanning circuit 20 controls the control signal ΦRES from the L level to the H level. Thereby, the reset transistor M2 is turned on, and the floating diffusion portion FD is reset to a predetermined potential in accordance with the voltage Vdd. A pixel signal in accordance with the reset potential of the floating diffusion portion FD (noise signal) is output to the output line 16.

The switch SW3 is turned off at time t35, and thereby the reset of the amplifier 44 is released. The noise signal output to the output line 16 is amplified at the second amplification factor and output from the amplifier 44.

Next, in the period from time t35 to time t36, the control circuit 80 supplies a H-level control signal to the n-channel transistor MN6 of the memory 52 on each column to turn on the n-channel transistor MN6. Thereby, a noise signal amplified at the second amplification factor (second noise signal) is held in the capacitor Cshn.

Next, at time t36, the control circuit 80 controls the control signal ΦSW5 from the L level to the H level.

Thereby, the switch SW5 is turned on, and the capacitance of the input capacitor CIN of the amplifier 44 becomes (CINa+CINb).

At the same time t36, the control circuit 80 controls the VCLIP control circuit 36 of the clip circuit 32 on each column to switch the voltage to be supplied to the non-inverting input terminal of the differential amplifier circuit 34 from the voltage V2 to the voltage V1. Thereby, the lower limit value of the potential of the output line 16 is limited to the voltage V1.

The switch SW5 is turned on at time t36, and thereby the amplification factor of the amplifier 44 becomes the first amplification factor expressed by (CINa+CINb)/CFa. The noise signal output to the output line 16 is amplified at the first amplification factor and output from the amplifier 44.

Next, in the period from time t36 to time t37, the control circuit 80 supplies a H-level control signal to the n-channel transistor MN6 of the memory 52 on each column to turn on the n-channel transistor MN6. Thereby, a noise signal amplified at the first amplification factor (first noise signal) is held in the capacitor Cshn.

Note that, as described in the first embodiment, the imaging device typically includes a single line memory for noise signal (capacitor Cshn) and a single line memory for a light detection signal (capacitor Cshs) on each column. In the driving in the present embodiment, however, since the second noise signal and the first noise signal are sequentially read out, the first noise signal is unable to be held in the capacitor Cshn in which the second noise signal has already been held. Accordingly, in a case of the driving in the present embodiment, the memory 52 used for holding the first noise signal and the first light detection signal and the memory 52 used for holding the second noise signal and the second light detection signal are provided separately from each other on each column of the memory unit 50.

Next, in the period from time t37 to time t38, the vertical scanning circuit 20 controls the control signal ΦTX from the L level to the H level. Thereby, the transfer transistor M1 is turned on, signal charge accumulated in the photoelectric converter PD during a predetermined exposure period are transferred to the floating diffusion portion FD, and the potential of the floating diffusion portion FD decreases. Thereby, the potential of the output line 16 decreases to the potential in accordance with the amount of signal charge transferred to the floating diffusion portion FD. The potential of the output line 16 reduced in such a way corresponds to a pixel signal in accordance with the amount of signal charge (light detection signal).

At this time, since the clip circuit 32 is connected to the output line 16, even when high luminance light enters some of the pixels 12, the lower limit value of the potential of the output line 16 connected to these pixels 12 is limited to the voltage V1. Accordingly, it is possible to prevent the potential of the output line 16 from decreasing below the operable potential of the current source 18, and it is possible to suppress occurrence of horizontal stripe noise. The light detection signal output to the output line 16 is amplified at the first amplification factor and output from the amplifier 44.

Next, in the period from time t38 to time t39, the control circuit 80 supplies a H-level control signal to the n-channel transistor MN5 of the memory 52 on each column to turn on the n-channel transistor MN5. Thereby, a light detection signal amplified at the first amplification factor (first light detection signal) is held in the capacitor Cshs.

Next, time t39, the control circuit 80 controls the control signal ΦSW2 from the L level to the H level. Thereby, the switch SW2 is turned on, and the capacitance of the negative feedback capacitor CF of the amplifier 44 becomes (CFa+CFb). Thereby, the amplification factor of the amplifier 44 becomes the second amplification factor expressed by (CINa+CINb)/(CFa+CFb).

At the same time t39, the control circuit 80 controls the VCLIP control circuit 36 of the clip circuit 32 on each column to switch the voltage to be supplied to the non-inverting input terminal of the differential amplifier circuit 34 from the voltage V1 to the voltage V2. Thereby, the lower limit value of the potential of the output line 16 is limited to the voltage V2. The light detection signal output to the output line 16 is amplified at the second amplification factor and output from the amplifier 44.

At this time, since the clip circuit 32 is connected to the output line 16, even when high luminance light enters some of the pixels 12, the lower limit value of the potential of the output line 16 connected to these pixels 12 is limited to the voltage V2. Accordingly, it is possible to prevent the potential of the output line 16 from decreasing below the operable potential of the current source 18, and it is possible to suppress occurrence of horizontal stripe noise.

Next, in the period from time t39 to time t40, the control circuit 80 supplies a H-level control signal to the n-channel transistor MN5 of the memory 52 on each column to turn on the n-channel transistor MN5. Thereby, a light detection signal amplified at the second amplification factor (second light detection signal) is held in the capacitor Cshs.

The horizontal scanning circuit 60 then supplies a H-level control signal to the n-channel transistors MN7 and MN8 of the memory 52, which holds the first light detection signal and the first noise signal, to turn on the n-channel transistors MN7 and MN8. Thereby, the first light detection signal is output to the horizontal output line 56a, and the first noise signal is output to the horizontal output line 56b. The differential amplifier circuit 72 outputs a difference between the first light detection signal and the first noise signal as the first signal.

Further, the horizontal scanning circuit 60 supplies a H-level control signal to the n-channel transistors MN7 and MN8 of the memory 52, which holds the second light detection signal and the second noise signal, to turn on the n-channel transistors MN7 and MN8. Thereby, the second light detection signal is output to the horizontal output line 56a, and the second noise signal is output to the horizontal output line 56b. The differential amplifier circuit 72 outputs a difference between the second light detection signal and the second noise signal as the second signal.

By driving the imaging device in such a way, it is possible to realize a high quality synthesis image with less image shift while suppressing occurrence of horizontal stripe noise.

In the drive method of the present embodiment, since the first noise signal and the second noise signal are acquired based on the same signal output to the output line 16, noise removal performance from a light detection signal can be improved compared to the drive method of the first embodiment. Since two memories 52 are required for each column in order to implement the driving of the present embodiment, however, the size of the imaging device may be increased.

Further, one of the conceivable measures to reduce horizontal stripe noise is to set the L level of the control signal ΦRES to a predetermined L level in accordance with the amplification factor of an amplifier circuit when switching the amplification factor of the amplifier 44. In using this scheme, it can be considered to set the L level of the control signal ΦRES in the period T22 and the period T23 to be higher than the L level of the control signal ΦRES in the period T21 and the period T24, as illustrated in the dotted line in FIG. 7, for example.

In terms of realizing a high quality synthesis image with less image shift, however, it is not preferable to perform driving to switch the L level of the control signal ΦRES. As described previously, it is desirable to generate the first light detection signal and the second light detection signal based on the same signal output to the output line 16. As illustrated in FIG. 7, for example, if the driving to switch the L level of the control signal ΦRES is performed at time t39, the potential of the floating diffusion portion FD fluctuates in response to a fluctuation of the gate potential of the reset transistor M2, and the potential of the output line 16 will thus fluctuate. As a result, it is no longer possible to generate the first light detection signal and the second light detection signal based on the same signal, and this leads to deterioration of image quality obtained after image synthesis. To obtain a high quality synthesis image, it is desirable to maintain the L level of the control signal ΦRES to be constant.

From such a point of view, also in the present embodiment, driving to switch the L level of the control signal ΦRES is not performed, but driving to switch the clip level of the output line 16 is performed. That is, occurrence of horizontal stripe noise is suppressed by setting a suitable clip level in association with each of the first amplification factor and the second amplification factor so that the potential of the output line 16 does not fall below the operable potential of the current source 18 even at incidence of high luminance light. Accordingly, it is possible to realize a high quality synthesis image with less image shift while suppressing occurrence of horizontal stripe noise.

As described above, according to the present embodiment, it is possible to suppress influence of horizontal stripe noise even at incidence of high luminance light and acquire a high quality image.

Third Embodiment

Figure 8:
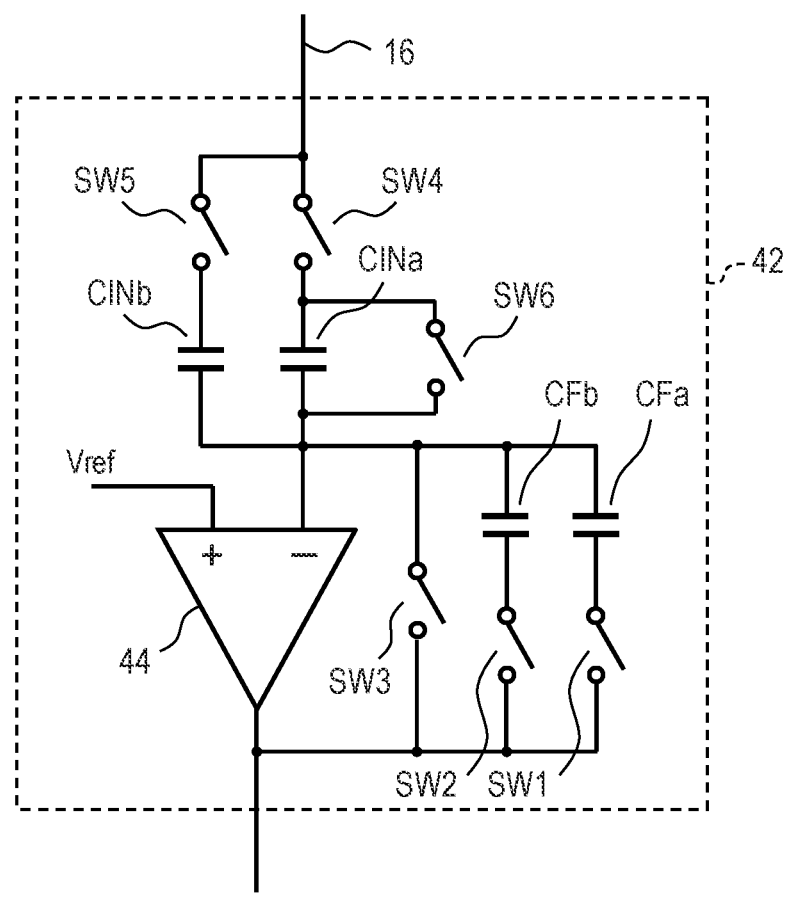
FIG. 8 is a circuit diagram illustrating a configuration example of a column readout circuit in an imaging device according to a third embodiment of the present invention.
Figure 9:
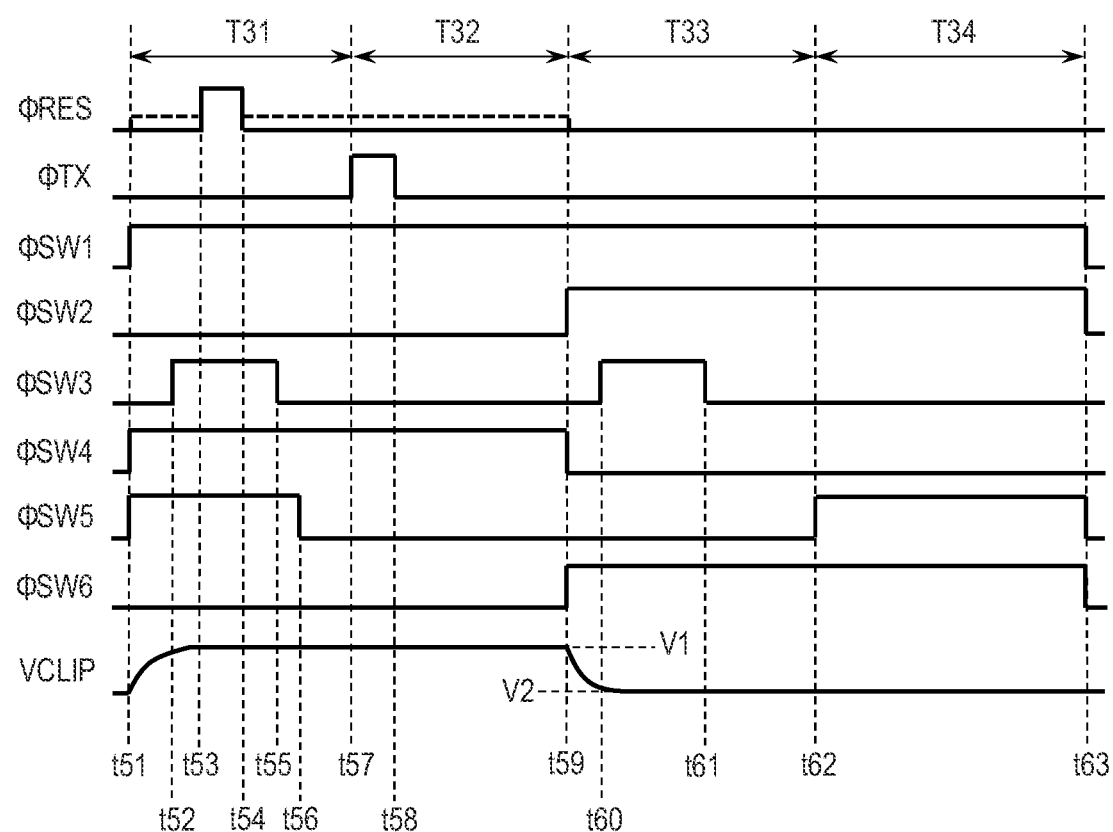
FIG. 9 is a timing diagram illustrating a method of driving the imaging device according to the third embodiment of the present invention.

An imaging device and a method of driving the same according to a third embodiment of the present invention will be described with reference to FIG. 8 and FIG. 9. The same components as those of the imaging device according to the first and second embodiments are labeled with the same references, and the description thereof will be omitted or simplified. FIG. 8 is a circuit diagram illustrating a configuration example of a readout circuit in the imaging device according to the present embodiment. FIG. 9 is a timing diagram illustrating a method of driving the imaging device according to the present embodiment.

The imaging device according to the present embodiment is the same as the imaging device according to the first and second embodiments except for a difference in the configuration of the column readout circuit 42. As illustrated in FIG. 8, the column readout circuit 42 of the imaging device according to the present embodiment further includes a switch SW6 connected to the capacitor CINa in parallel in the column readout circuit 42 of the second embodiment. The remaining configuration of the column readout circuit 42 is the same as that of the column readout circuit 42 of the second embodiment illustrated in FIG. 6.

The connection state (conduction or non-conduction) of the switch SW6 is controlled by a control signal ΦSW6 supplied from the control circuit 80. For example, when the control signal ΦSW6 is at the H level, the switch SW6 is in an on-state (conduction state), and when the control signal ΦSW6 is at the L level, the switch SW6 is in an off-state (non-conduction state). When turned on, the switch SW6 short-circuits a line between the electrodes of the capacitor CINa to reset the capacitor CINa.

The amplification factor of the amplifier 44 is expressed by the ratio (CIN/CF) of the input capacitor CIN and the negative feedback capacitor CF. Herein, the input capacitor CIN is CINa+CINb when both the switches SW4 and SW5 are in the on-state, CIN is CINa when the switch SW4 is in the on-state and the switch SW5 is in the off-state, and CIN is CINb when the switch SW4 is in the off-state and the switch SW5 is in the on-state.

The capacitances of the capacitors CINa and CINb can be set as appropriate in accordance with the amplification factor required for the amplifier circuit of the column readout circuit 42. For simplified illustration, it is assumed here that CINa=CINb and CFa<CFb, and CINa=CFa+CFb or CINb=CFa+CFb. When the amplification factor of the amplifier 44 is to be set to the first amplification factor that is the high amplification factor, the switch SW1 is turned on, the switch SW2 is turned off, one of the switch SW4 and the switch SW5 is turned on, and the other is turned off, for example. At this time, the amplification factor of the amplifier 44 becomes CINa/CFa or CINb/CFa. When the amplification factor of the amplifier 44 is to be set to the second amplification factor that is the low amplification factor, the switches SW1 and SW2 are turned on, one of the switch SW4 and the switch SW5 is turned on, and the other is turned off, for example. At this time, the amplification factor of the amplifier 44 becomes CINa/(CFa+CFb) or CINb/(CFa+CFb). A larger difference between the capacitance of the capacitor CFa and the capacitance of the capacitor CFb results in a larger amplification factor difference between the first amplification factors and the second amplification factors.

Next, the method of driving the imaging device according to the present embodiment will be described with reference to FIG. 9. FIG. 9 further illustrates the control signal ΦSW6 supplied to the column readout circuit 42 on each column of the readout circuit unit 40 in addition to the control signals ΦRES, ΦTX, ΦSW1, ΦSW2, ΦSW3, ΦSW4, and ΦSW5 and the clip level VCLIP illustrated in FIG. 7.

In FIG. 9, a period T31 (time t51 to time t57) is a readout period of a noise signal amplified at the first amplification factor (first noise signal). A period T32 (time t57 to time t59) is a readout period of a light detection signal amplified at the first amplification factor (first light detection signal). A period T33 (time t59 to time t62) is a readout period of a noise signal amplified at the second amplification factor (second noise signal). A period T34 (time t62 to time t63) is a readout period of a light detection signal amplified at the second amplification factor (second light detection signal). In the present embodiment, signal readout is performed in the order of the first noise signal, the first light detection signal, the second noise signal, and the second light detection signal. Note that, also in the present embodiment, the first amplification factor is higher than the second amplification factor.

In the period before time t51, the control signals ΦRES and ΦTX and the control signals ΦSW1, ΦSW2, ΦSW3, ΦSW4, ΦSW5, and ΦSW6 on a row to be read out are at the L level. Further, although not illustrated in FIG. 9, the control signal ΦSEL on a row to be read out is at the H level from the period T31 to the period T34.

At time t51, the control circuit 80 controls the control signal ΦSW1, ΦSW4, and ΦSW5 from the L level to the H level. Thereby, the switch SW1 is turned on, and the capacitance of the negative feedback capacitor CF of the amplifier 44 becomes CFa.

At the same time t51, the control circuit 80 controls the VCLIP control circuit 36 of the clip circuit 32 on each column and supplies the voltage V1 to the non-inverting input terminal of the differential amplifier circuit 34. Thereby, the lower limit value of the potential of the output line 16 is limited to the voltage V1.

Next, in the period from time t52 to time t55, the control circuit 80 controls the control signal ΦSW3 from the L level to the H level. Thereby, the switch SW3 is turned on, and the amplifier 44 is reset.

Next, in the period from time t53 to time t54, the vertical scanning circuit 20 controls the control signal ΦRES from the L level to the H level. Thereby, the reset transistor M2 is turned on, and the floating diffusion portion FD is reset to a predetermined potential in accordance with the voltage Vdd. A pixel signal in accordance with the reset potential of the floating diffusion portion FD (noise signal) is output to the output line 16.

The switch SW3 is turned off at time t55, and thereby the reset of the amplifier 44 is released. Then, the switch SW5 is turned off at time t56, and thereby the potential of the noise signal output to the output line 16 is held at the node between the switch SW5 and the capacitor CINb.

Further, the switch SW5 is turned off, and thereby the capacitance of the input capacitor CIN of the amplifier 44 becomes CINa. Accordingly, the amplification factor of the amplifier 44 is set to the first amplification factor expressed as CINa/CFa. The noise signal output to the output line 16 is amplified at the first amplification factor and output from the amplifier 44.

Next, in the period from time t56 to time t57, the control circuit 80 supplies a H-level control signal to the n-channel transistor MN6 of the memory 52 on each column to turn on the n-channel transistor MN6. Thereby, a noise signal amplified at the first amplification factor (first noise signal) is held in the capacitor Cshn.

Next, in the period from time t57 to time t58, the vertical scanning circuit 20 controls the control signal ΦTX from the L level to the H level. Thereby, the transfer transistor M1 is turned on, signal charge accumulated in the photoelectric converter PD during a predetermined exposure period are transferred to the floating diffusion portion FD, and the potential of the floating diffusion portion FD decreases. Thereby, the potential of the output line 16 decreases to the potential in accordance with the amount of signal charge transferred to the floating diffusion portion FD. The potential of the output line 16 reduced in such a way corresponds to a pixel signal in accordance with the amount of signal charge (light detection signal).

At this time, since the clip circuit 32 is connected to the output line 16, even when high luminance light enters some of the pixels 12, the lower limit value of the potential of the output line 16 connected to these pixels 12 is limited to the voltage V1. Accordingly, it is possible to prevent the potential of the output line 16 from decreasing below the operable potential of the current source 18, and it is possible to suppress occurrence of horizontal stripe noise. The light detection signal output to the output line 16 is amplified at the first amplification factor and output from the amplifier 44.

Next, in the period from time t58 to time t59, the control circuit 80 supplies a H-level control signal to the n-channel transistor MN5 of the memory 52 on each column to turn on the n-channel transistor MN5. Thereby, a light detection signal amplified at the first amplification factor (first light detection signal) is held in the capacitor Cshs.

The horizontal scanning circuit 60 then supplies a H-level control signal to the n-channel transistors MN7 and MN8 to turn on the n-channel transistors MN7 and MN8. Thereby, the first light detection signal is output to the horizontal output line 56a, and the first noise signal is output to the horizontal output line 56b. The differential amplifier circuit 72 outputs a difference between the first light detection signal and the first noise signal as the first signal.

Next, at time t59, the control circuit 80 controls the control signals ΦSW2 and ΦSW6 from the L level to the H level and controls the control signal ΦSW4 from the H level to the L level. Thereby, the switches SW1 and SW2 are turned on, the capacitance of the negative feedback capacitor CF of the amplifier 44 becomes (CFa+CFb). Further, the switch SW6 is turned on, and thereby the capacitance of the input capacitor CIN of the amplifier 44 becomes CINb. Further, the amplification factor of the amplifier 44 becomes the second amplification factor expressed as CINb/(CFa+CFb).

At the same time t59, the control circuit 80 controls the VCLIP control circuit 36 of the clip circuit 32 on each column and switches the voltage to be supplied to the non-inverting input terminal of the differential amplifier circuit 34 from the voltage V1 to the voltage V2. Thereby, the lower limit value of the potential of the output line 16 is limited to the voltage V2.

Next, in the period from time t60 to time t61, the control circuit 80 controls the control signal ΦSW3 from the L level to the H level. Thereby, the switch SW3 is turned on, and the amplifier 44 is reset.

At time t61, since the potential of the noise signal obtained before amplification is performed is held in the node between the switch SW5 and the capacitor CINb, the amplifier 44 amplifies this noise signal at the second amplification factor and outputs the amplified noise signal as the second noise signal.

Next, in the period from time t61 to time t62, the control circuit 80 supplies a H-level control signal to the n-channel transistor MN6 of the memory 52 on each column to turn on the n-channel transistor MN6. Thereby, a noise signal amplified at the second amplification factor (second noise signal) is held in the capacitor Cshn.

Next, at time t62, the control circuit 80 controls the control signal ΦSW5 from the L level to the H level. Thereby, the switch SW5 is turned on, and an output line to which a pixel signal in accordance with the amount of signal charge (light detection signal) is being output is again input to the amplifier 44 via the switch SW5 and the capacitor CINb. Thereby, the light detection signal is amplified at the second amplification factor and output from the amplifier 44.

Next, in the period from time t62 to time t63, the control circuit 80 supplies a H-level control signal to the n-channel transistor MN5 of the memory 52 on each column to turn on the n-channel transistor MN5. Thereby, a light detection signal amplified at the second amplification factor (second light detection signal) is held in the capacitor Cshs.

The horizontal scanning circuit 60 then supplies a H-level control signal to the n-channel transistors MN7 and MN8 to turn on the n-channel transistors MN7 and MN8. Thereby, the second light detection signal is output to the horizontal output line 56a, and the second noise signal is output to the horizontal output line 56b. The differential amplifier circuit 72 outputs a difference between the second light detection signal and the second noise signal as the second signal.

By driving the imaging device in such a way, it is possible to realize a high quality synthesis image with less image shift while suppressing occurrence of horizontal stripe noise.

In the drive method of the present embodiment, since the first noise signal and the second noise signal are acquired based on the same signal output to the output line 16, noise removal performance from a light detection signal can be improved compared to the drive method of the first embodiment. In particular, in the present embodiment, it is not required to provide a plurality of memories 52 on each column, and this can prevent an increase in the size of the imaging device.

Further, one of the conceivable measures to reduce horizontal stripe noise is to set the L level of the control signal ΦRES to a predetermined L level in accordance with the amplification factor of an amplifier circuit when switching the amplification factor of the amplifier 44. In using this scheme, it can be considered to set the L level of the control signal ΦRES in the period T31 and the period T32 to be higher than the L level of the control signal ΦRES in the period T33 and the period T34, as illustrated in the dotted line in FIG. 9, for example.

In terms of realizing a high quality synthesis image with less image shift, however, it is not preferable to perform driving to switch the L level of the control signal ΦRES. As described previously, it is desirable to generate the first light detection signal and the second light detection signal based on the same signal output to the output line 16. As illustrated in FIG. 9, for example, if the driving to switch the L level of the control signal ΦRES is performed at time t59, the potential of the floating diffusion portion FD fluctuates in response to a fluctuation of the gate potential of the reset transistor M2, and the potential of the output line 16 will thus fluctuate. As a result, it is no longer possible to generate the first light detection signal and the second light detection signal based on the same signal, and this leads to deterioration of image quality obtained after image synthesis. To obtain a high quality synthesis image, it is desirable to maintain the L level of the control signal ΦRES to be constant.

From such a point of view, also in the present embodiment, driving to switch the L level of the control signal ΦRES is not performed, but driving to switch the clip level of the output line 16 is performed. That is, occurrence of horizontal stripe noise is suppressed by setting a suitable clip level in association with each of the first amplification factor and the second amplification factor so that the potential of the output line 16 does not fall below the operable potential of the current source 18 even at incidence of high luminance light. Accordingly, it is possible to realize a high quality synthesis image with less image shift while suppressing occurrence of horizontal stripe noise.

As described above, according to the present embodiment, it is possible to suppress influence of horizontal stripe noise even at incidence of high luminance light and acquire a high quality image.

Fourth Embodiment

Figure 10:
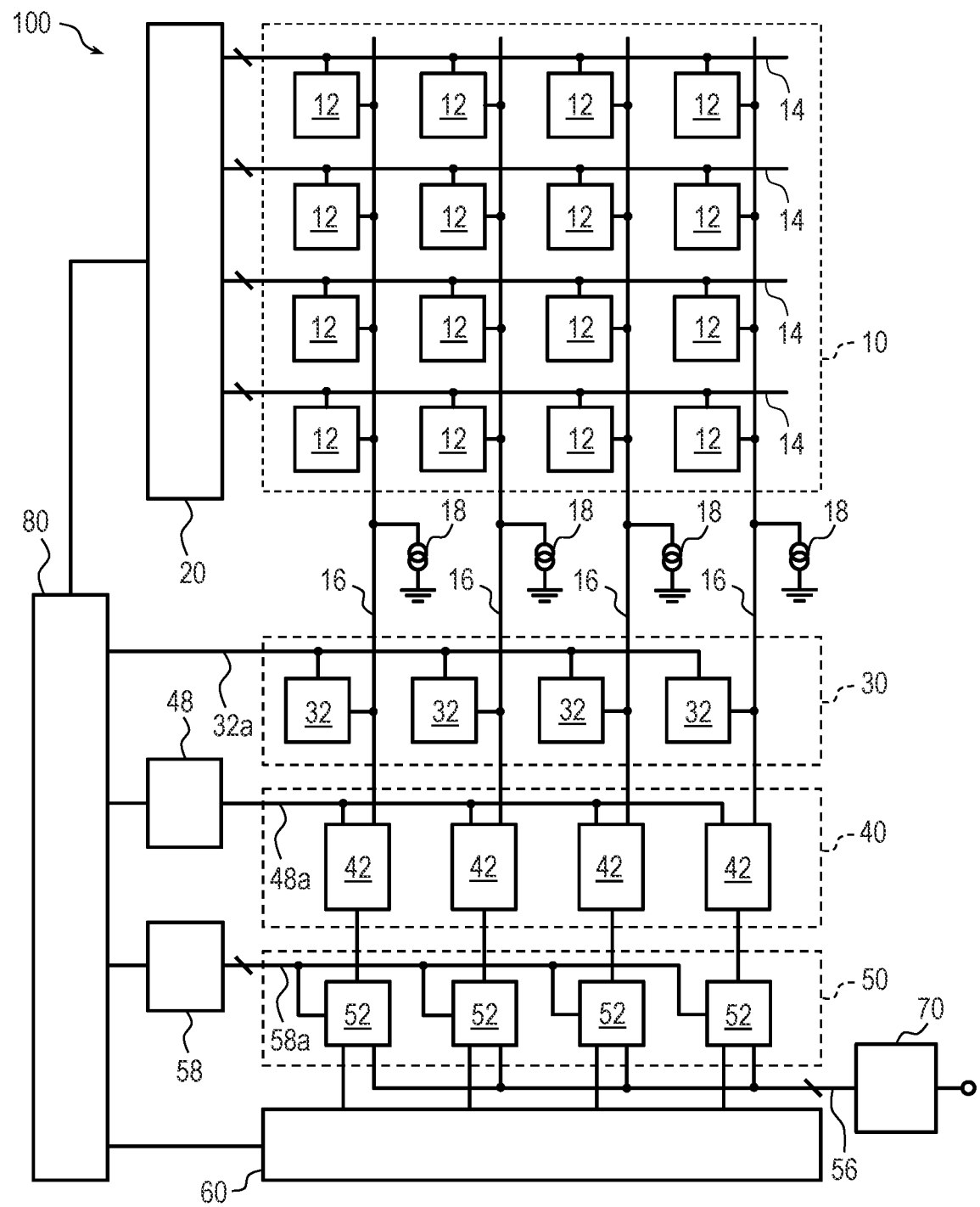
FIG. 10 is a block diagram illustrating a general configuration of an imaging device according to a fourth embodiment of the present invention.
Figure 11:
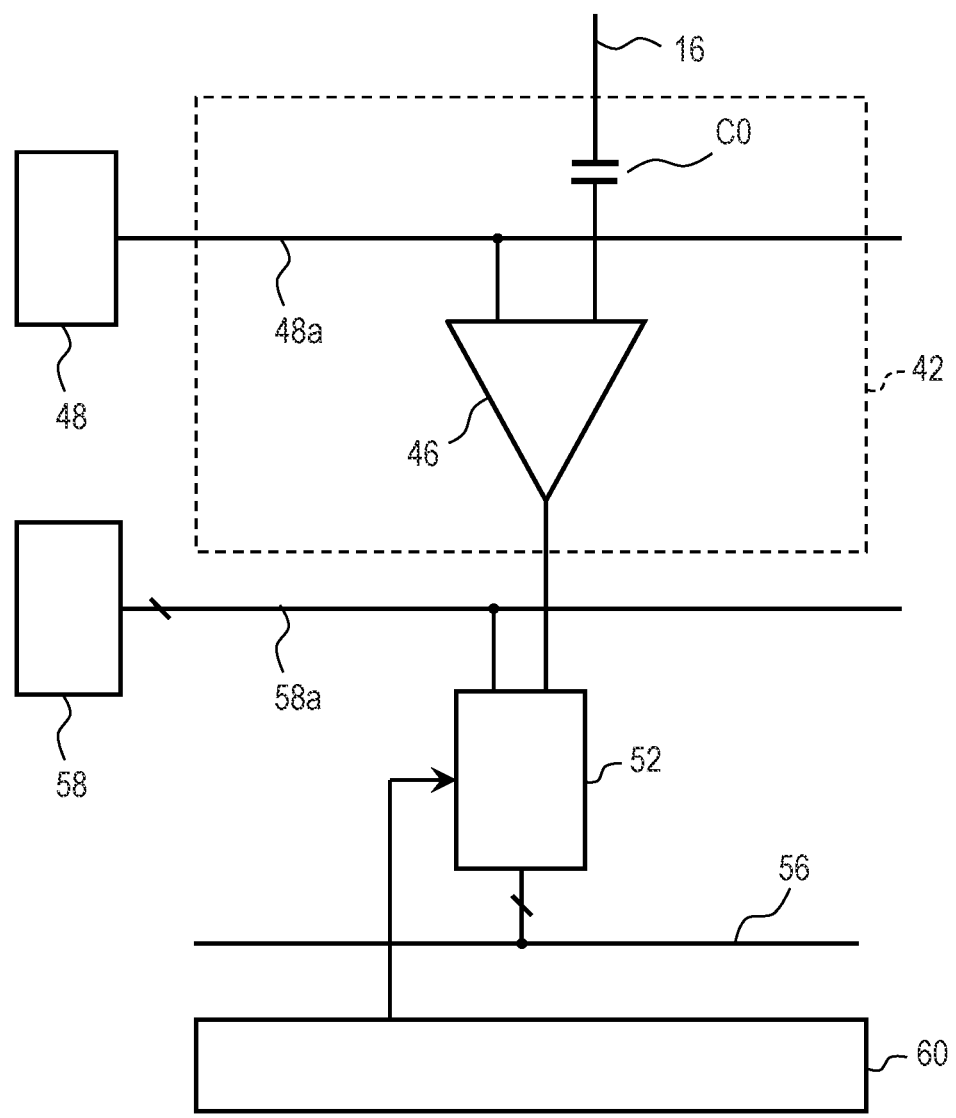
FIG. 11 is a circuit diagram illustrating a configuration example of a column readout circuit and a memory in the imaging device according to the fourth embodiment of the present invention.

An imaging device and a method of driving the same according to a fourth embodiment of the present invention will be described with reference to FIG. 10 to FIG. 12. The same components as those of the imaging device according to the first to the third embodiments are labeled with the same references, and the description thereof will be omitted or simplified. FIG. 10 is a block diagram illustrating a general configuration of the imaging device according to the present embodiment. FIG. 11 is a circuit diagram illustrating a configuration example of the column readout circuit and the memory in the imaging device according to the present embodiment. FIG. 12 is a timing diagram illustrating the method of driving the imaging device according to the present embodiment.

In the first to third embodiments, the example of using the first signal and the second signal amplified at different amplification factors to synthesize a high dynamic range image has been illustrated. In the present embodiment, an example of using the first signal and the second signal obtained by performing AD conversion at different conversion gains to synthesizes a high dynamic range image will be illustrated.

As illustrated in FIG. 10, the imaging device 100 according to the present embodiment further includes a reference signal generation circuit 48 and a counter circuit 58 in addition to the configuration illustrated in FIG. 1. Further, as illustrated in FIG. 11, the column readout circuit 42 may be formed including a capacitor C0 and a comparator 46. The memory 52 holds digital data of a pixel signal on a bit basis on which AD conversion has been performed. In the present embodiment, the column readout circuit 42 forms a column AD conversion unit.

The comparator 46 has two input nodes and one output node. One of the input nodes of the comparator 46 is connected to the output line 16 on a corresponding column via the capacitor C0. The other input node of the comparator 46 is connected to the reference signal generation circuit 48 via a reference signal line 48a common to respective columns.

The memory 52 includes an N-memory (not illustrated) that holds digital data of a noise signal and an S-memory (not illustrated) that holds digital data of a light detection signal. Further the memory 52 has two input nodes, one output node, and one control node. One of the input nodes of the memory 52 is connected to the output node of the comparator 46. The other input node of the memory 52 is connected to the counter circuit 58 via a count signal line 58a common to respective columns. The output node of the memory 52 is connected to the horizontal output line 56. The control node of the memory 52 is connected to the horizontal scanning circuit 60.

The reference signal generation circuit 48 supplies a reference signal having a predetermined amplitude to the comparator 46 on each column via the reference signal line 48a. The reference signal may be a signal whose signal level (magnitude of the signal) changes with time, for example. Typically, the reference signal is a ramp signal. The ramp signal is a signal whose signal level monotonically changes with time, which is a signal whose output voltage monotonically decreases or monotonically increases with time, for example. Note that the reference signal is not particularly limited as long as it has an amplitude that is applicable to AD conversion. The operation of the reference signal generation circuit 48 is controlled by the control circuit 80.

The comparator 46 on each column compares a level of the pixel signal read out from the pixels 12 on a corresponding column via the output line 16 with the reference signal supplied from the reference signal generation circuit 48 and outputs a signal in accordance with a result of the comparison to the memory 52. Specifically, the comparator 46 compares the magnitude of a pixel signal with the magnitude of a reference signal and, in response to inversion of the level relationship between these signals, causes the output signal to transition from a high level to a low level or from a low level to a high level.

The counter circuit 58 starts a count operation in synchronization with a timing of start of a change in a signal level of the reference signal output from the reference signal generation circuit 48 and outputs a count signal indicating the count value to the memory 52 on each column.

The memory 52 on each column stores, as digital data, a count value indicated by a count signal being output from the counter circuit 58 at a timing when the signal level of the output signal of the comparator 46 on a corresponding column is inverted. The memory 52 on each column includes the N-memory (not illustrated) that holds digital data for a noise signal and the S-memory (not illustrated) that holds digital data for a light detection signal.

In such a way, the column readout circuit 42 and the memory 52 arranged on each column form an AD conversion circuit that digitally converts a pixel signal output from the pixel 12 from an analog signal into a digital signal.

The horizontal scanning circuit 60 supplies, to the memory 52, a control signal used for transferring digital data stored in the memory 52 to the output circuit 70 sequentially on a column basis.

Next, the method of driving the imaging device according to the present embodiment will be described with reference to FIG. 12. FIG. 12 further illustrates a signal waveform of the reference signal (VRAMP) and a count period of the counter circuit 58 (COUNT) in addition to the control signals ΦRES and ΦTX and the clip level VCLIP illustrated in FIG. 5 and the like. An example in which a downslope ramp signal whose voltage gradually decreases from the power supply voltage is applied as a reference signal is illustrated here.

When the slope of the ramp signal is small, since the ramp signal change amount per one counter clock becomes smaller, the resolution of AD conversion is improved. Since this enables fine detection of a fluctuation in the potential of the output line 16, the amplification factor (AD conversion gain) increases. On the other hand, when the slope of the ramp signal is large, since the ramp signal change amount per one counter clock becomes larger, the resolution of AD conversion decreases. Since this results in coarse detection of a fluctuation in the potential of the output line 16, the amplification factor (AD conversion gain) decreases.

In FIG. 12, a period T41 (time t71 to time t75) is a readout period of a noise signal amplified at the first amplification factor (first noise signal). A period T42 (time t75 to time t78) is a readout period of a light detection signal amplified at the first amplification factor (first light detection signal). A period T43 (time t78 to time t80) is a readout period of a light detection signal amplified at the second amplification factor that is different from the first amplification factor (second light detection signal). A period T44 (time t80 to time t84) is a readout period of a noise signal amplified at the second amplification factor (second noise signal). In the present embodiment, signal readout is performed in the order of the first noise signal, the first light detection signal, the second light detection signal, and the second noise signal.

In the period before time t71, the control signals ΦRES and ΦTX on a row to be read out are at the L level. Further, although not illustrated in FIG. 12, the control signal ΦSEL on a row to be read out is at the H level from time t71 to time t84.

At time t71, the control circuit 80 controls the VCLIP control circuit 36 of the clip circuit 32 on each column and supplies the voltage V1 to the non-inverting input terminal of the differential amplifier circuit 34. Thereby, the lower limit value of the potential of the output line 16 is limited to the voltage V1.

Next, in the period from time t72 to time t73, the vertical scanning circuit 20 controls the control signal ΦRES from the L level to the H level. Thereby, the reset transistor M2 is turned on, and the floating diffusion portion FD is reset to a predetermined potential in accordance with the voltage Vdd. A pixel signal in accordance with the reset potential of the floating diffusion portion FD (noise signal) is output to the output line 16.

Next, at time t74, the reference signal generation circuit 48 starts changing the potential level of the reference signal being output to the reference signal line 48a. The slope of the reference signal at this time is a relatively small first slope and corresponds to the first amplification factor in the first to third embodiments. The counter circuit 58 starts count in synchronization with the start of the change in the potential level of the reference signal and outputs a count signal indicating a count value to the count signal line 58a.

The comparator 46 causes the output signal to transition from the high level to the low level or from the low level to the high level at a timing when the level relationship between the level of the noise signal being output to the output line 16 and the level of the reference signal being output to the reference signal line 48a is inverted. The memory 52 holds the count value being output to the count signal line 58a at this time as digital data of a noise signal in accordance with the change in the level of the output signal of the comparator 46. This digital data corresponds to the noise signal amplified at the first amplification factor (first noise signal).

Next, in the period from time t75 to time t76, the vertical scanning circuit 20 controls the control signal ΦTX from the L level to the H level. Thereby, the transfer transistor M1 is turned on, signal charge accumulated in the photoelectric converter PD during a predetermined exposure period are transferred to the floating diffusion portion FD, and the potential of the floating diffusion portion FD decreases. Thereby, the potential of the output line 16 decreases to the potential in accordance with the amount of signal charge transferred to the floating diffusion portion FD. The potential of the output line 16 reduced in such a way corresponds to a pixel signal in accordance with the amount of signal charge (light detection signal).

At this time, since the clip circuit 32 is connected to the output line 16, even when high luminance light enters some of the pixels 12, the lower limit value of the potential of the output line 16 connected to these pixels 12 is limited to the voltage V1. Accordingly, it is possible to prevent the potential of the output line 16 from decreasing below the operable potential of the current source 18, and it is possible to suppress occurrence of horizontal stripe noise.

Next, at time t77, the reference signal generation circuit 48 starts changing the potential level of the reference signal being output to the reference signal line 48a. The slope of the reference signal at this time is the relatively small first slope and corresponds to the first amplification factor in the first to third embodiments. The counter circuit 58 starts count in synchronization with the start of the change in the potential level of the reference signal and outputs a count signal indicating a count value to the count signal line 58a.

The comparator 46 causes the output signal to transition from the high level to the low level or from the low level to the high level at a timing when the level relationship between the level of the light detection signal being output to the output line 16 and the level of the reference signal being output to the reference signal line 48a is inverted. The memory 52 holds the count value being output to the count signal line 58a at this time as digital data of a light detection signal in accordance with the change in the level of the output signal of the comparator 46. This digital data corresponds to the light detection signal amplified at the first amplification factor (first light detection signal).

Next, at time t78, the control circuit 80 controls the VCLIP control circuit 36 of the clip circuit 32 on each column and switches the voltage to be supplied to the non-inverting input terminal of the differential amplifier circuit 34 from the voltage V1 to the voltage V2. Thereby, the lower limit value of the potential of the output line 16 is limited to the voltage V2.

Next, at time t79, the reference signal generation circuit 48 starts changing the potential level of the reference signal being output to the reference signal line 48a. The slope of the reference signal at this time is the relatively large second slope and corresponds to the second amplification factor in the first to third embodiments. The counter circuit 58 starts count in synchronization with the start of the change in the potential level of the reference signal and outputs a count signal indicating a count value to the count signal line 58a.

The comparator 46 causes the output signal to transition from the high level to the low level or from the low level to the high level at a timing when the level relationship between the level of the light detection signal being output to the output line 16 and the level of the reference signal being output to the reference signal line 48a is inverted. The memory 52 holds the count value being output to the count signal line 58a at this time as digital data of a light detection signal in accordance with the change in the level of the output signal of the comparator 46. This digital data corresponds to the light detection signal amplified at the second amplification factor (second light detection signal).

Next, in the period from time t81 to time t82, the vertical scanning circuit 20 controls the control signal ΦRES from the L level to the H level. Thereby, the reset transistor M2 is turned on, and the floating diffusion portion FD is reset to a predetermined potential in accordance with the voltage Vdd. A pixel signal (noise signal) in accordance with the reset potential of the floating diffusion portion FD is output to the output line 16.

Next, at time t83, the reference signal generation circuit 48 starts changing the potential level of the reference signal being output to the reference signal line 48a. The slope of the reference signal at this time is the relatively large second slope and corresponds to the second amplification factor in the first to third embodiments. The counter circuit 58 starts count in synchronization with the start of the change in the potential level of the reference signal and outputs a count signal indicating a count value to the count signal line 58a.

The comparator 46 causes the output signal to transition from the high level to the low level or from the low level to the high level at a timing when the level relationship between the level of the noise signal being output to the output line 16 and the level of the reference signal being output to the reference signal line 48a is inverted. The memory 52 holds the count value being output to the count signal line 58a at this time as digital data of a noise signal in accordance with the change in the level of the output signal of the comparator 46. This digital data corresponds to the noise signal amplified at the second amplification factor (second noise signal).

The horizontal scanning circuit 60 then supplies a control signal to the memory 52 and transfers the first noise signal, the second noise signal, the first light detection signal, and the second light detection signal to the output circuit 70 via the horizontal output line 56 on a column basis. The output circuit 70 performs a process of subtracting the digital value of the first noise signal from the digital value of the first light detection signal and outputs the processed signal as the digital data of the first signal. Further, the output circuit 70 performs a process of subtracting the digital value of the second noise signal from the digital value of the second light detection signal and outputs the processed signal as the digital data of the second signal.

Note that a noise signal superimposed on the second light detection signal obtained by amplifying a light detection signal at the second amplification factor and the second noise signal are different from each other. However, since a signal amplified at the second amplification factor that is lower than the first amplification factor is mainly used on the high luminance side after image synthesis, optical shot noise is dominant even if these noise signals differ from each other, and there is little influence on the image quality obtained after image synthesis.

By driving the imaging device in such a way, it is possible to realize a high quality synthesis image with less image shift while suppressing occurrence of horizontal stripe noise.

One of the conceivable measures to reduce horizontal stripe noise may be to set the L level of the control signal ΦRES to a predetermined L level in accordance with the AD conversion gain when switching the AD conversion gain in the column readout circuit 42. In using this scheme, it can be considered to set the L level of the control signal ΦRES in the period T41 and the period T42 to be higher than the L level of the control signal ΦRES in the period T43 and the period T44, as illustrated in the dotted line in FIG. 12, for example.

In terms of realizing a high quality synthesis image with less image shift, however, it is not preferable to perform driving to switch the L level of the control signal ΦRES. As described previously, it is desirable to generate the first light detection signal and the second light detection signal based on the same signal output to the output line 16. As illustrated in FIG. 12, for example, if the driving to switch the L level of the control signal ΦRES is performed at time t78, the potential of the floating diffusion portion FD fluctuates in response to a fluctuation of the gate potential of the reset transistor M2, and the potential of the output line 16 will thus fluctuate. As a result, it is no longer possible to generate the first light detection signal and the second light detection signal based on the same signal, and this leads to deterioration of image quality obtained after image synthesis. To obtain a high quality synthesis image, it is desirable to maintain the L level of the control signal ΦRES to be constant.

From such a point of view, also in the present embodiment, driving to switch the L level of the control signal ΦRES is not performed, but driving to switch the clip level of the output line 16 is performed. That is, occurrence of horizontal stripe noise is suppressed by setting a suitable clip level in association with each of the first amplification factor and the second amplification factor so that the potential of the output line 16 does not fall below the operable potential of the current source 18 even at incidence of high luminance light. Accordingly, it is possible to realize a high quality synthesis image with less image shift while suppressing occurrence of horizontal stripe noise.

As described above, according to the present embodiment, it is possible to suppress influence of horizontal stripe noise even at incidence of high luminance light and acquire a high quality image.

Fifth Embodiment

An imaging system according to a fifth embodiment of the present invention will be described with reference to FIG. 13. FIG. 13 is a block diagram illustrating a general configuration of the imaging system according to the present embodiment.

The imaging device 100 described in the above first to fourth embodiments can be applied to various imaging systems. Examples of applicable imaging systems may include a digital still camera, a digital camcorder, a surveillance camera, a copying machine, a fax machine, a mobile phone, an on-vehicle camera, an observation satellite, and the like. In addition, a camera module including an optical system such as a lens and an imaging device is also included in the imaging system. FIG. 13 illustrates a block diagram of a digital still camera as an example out of these examples.

An imaging system 200 illustrated as an example in FIG. 13 includes an imaging device 201, a lens 202 that captures an optical image of a subject onto the imaging device 201, an aperture 204 for changing a light amount passing through the lens 202, and a barrier 206 for protecting the lens 202. The lens 202 and the aperture 204 form an optical system that collects a light onto the imaging device 201. The imaging device 201 is the imaging device 100 described in any of the first to fourth embodiments and converts an optical image captured by the lens 202 into image data.

Further, the imaging system 200 includes a signal processing unit 208 that processes a signal output from the imaging device 201. The signal processing unit 208 generates image data from digital signals output by the imaging device 201. Further, the signal processing unit 208 performs operations of performing various correction or compression to output image data, if necessary. When the imaging device 100 outputs an analog signal as a pixel signal, the signal processing unit 208 may include an AD conversion unit. The process performed by the signal processing unit 208 may include a process of generating a high dynamic range image from an image based on the first signal and an image based on the second signal described above.

Furthermore, the imaging system 200 includes a memory unit 210 for temporarily storing image data therein and an external interface unit (external I/F unit) 212 for communicating with an external computer or the like. The imaging system 200 further includes a storage medium 214 such as a semiconductor memory for performing storage or readout of imaging data and a storage medium control interface unit (storage medium control I/F unit) 216 for performing storage or readout on the storage medium 214. Note that the storage medium 214 may be embedded in the imaging system 200 or may be removable.

Furthermore, the imaging system 200 includes a general control/operation unit 218 that performs various calculation and controls the entire digital still camera and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes an output signal output from the imaging device 201.

The imaging device 201 outputs an imaging signal to the signal processing unit 208. The signal processing unit 208 performs predetermined signal processing on an imaging signal output from the imaging device 201 and outputs image data. The signal processing unit 208 uses an imaging signal to generate an image.

As described above, according to the present embodiment, the imaging system to which the imaging device 100 according to any of the first to fourth embodiments is applied can be realized.

Sixth Embodiment

Figure 14A:
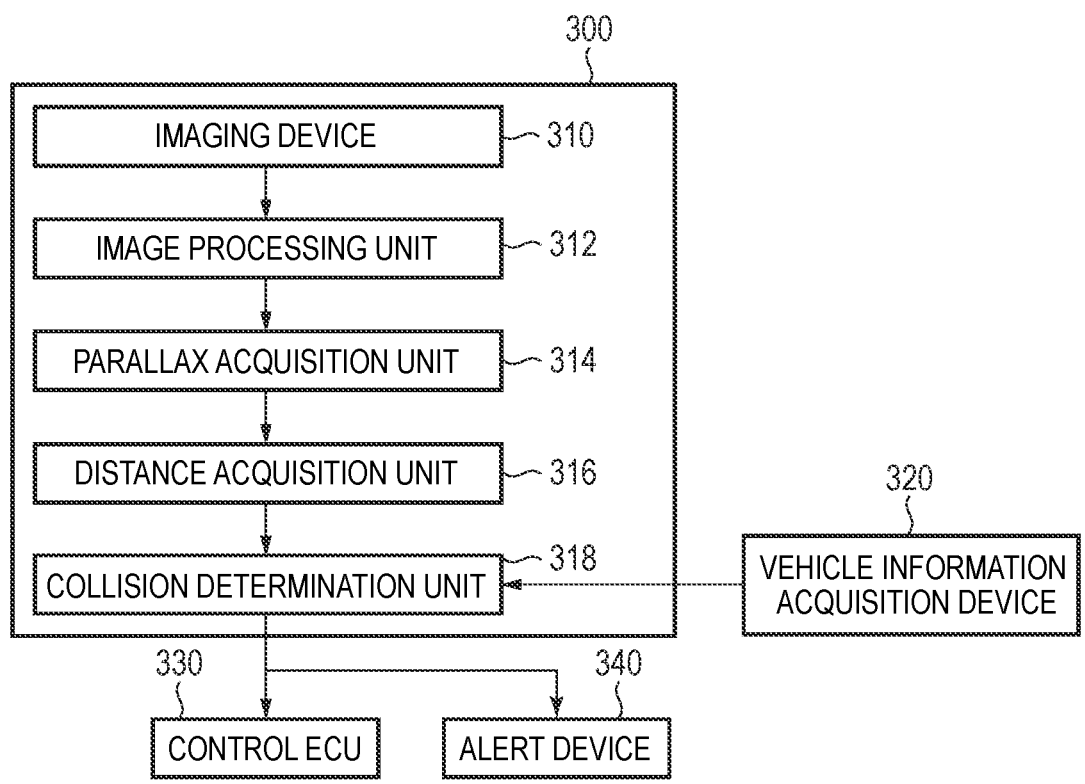
FIG. 14A is a diagram illustrating a configuration example of an imaging system according to a sixth embodiment of the present invention.
Figure 14B:
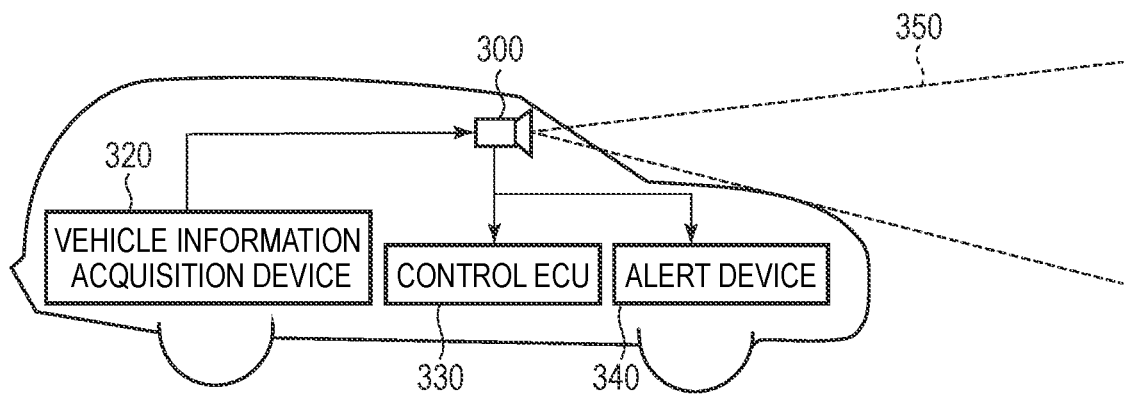
FIG. 14B is a diagram illustrating a configuration example of a movable object according to the sixth embodiment of the present invention.

An imaging system and a movable object according to a sixth embodiment of the present invention will be described with reference to FIG. 14A and FIG. 14B. FIG. 14A is a diagram illustrating a configuration of the imaging system according to the present embodiment. FIG. 14B is a diagram illustrating a configuration of the movable object according to the present embodiment.

FIG. 14A illustrates an example of an imaging system related to an on-vehicle camera. An imaging system 300 includes an imaging device 310. The imaging device 310 is the imaging device 100 described in any of the above first to fourth embodiments. The imaging system 300 includes an image processing unit 312 that performs image processing on a plurality of image data acquired by the imaging device 310 and a parallax acquisition unit 314 that calculates a parallax (a phase difference of parallax images) from the plurality of image data acquired by the imaging system 300. Further, the imaging system 300 includes a distance acquisition unit 316 that calculates a distance to the object based on the calculated parallax and a collision determination unit 318 that determines whether or not there is a collision possibility based on the calculated distance. Here, the parallax acquisition unit 314 and the distance acquisition unit 316 are an example of a distance information acquisition unit that acquires distance information on the distance to the object. That is, the distance information is information on a parallax, a defocus amount, a distance to an object, or the like. The collision determination unit 318 may use any of the distance information to determine the collision possibility. The distance information acquisition unit may be implemented by dedicatedly designed hardware or may be implemented by a software module. Further, the distance information acquisition unit may be implemented by a field programmable gate array (FPGA), an application specific integrated circuit (ASIC), or the like or may be implemented by a combination thereof.

The imaging system 300 is connected to the vehicle information acquisition device 320 and can acquire vehicle information such as a vehicle speed, a yaw rate, a steering angle, or the like. Further, the imaging system 300 is connected to a control ECU 330, which is a control device that outputs a control signal for causing a vehicle to generate braking force based on a determination result by the collision determination unit 318. Further, the imaging system 300 is also connected to an alert device 340 that issues an alert to the driver based on a determination result by the collision determination unit 318. For example, when the collision probability is high as the determination result of the collision determination unit 318, the control ECU 330 performs vehicle control to avoid a collision or reduce damage by applying a brake, pushing back an accelerator, suppressing engine power, or the like. The alert device 340 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 300. FIG. 14B illustrates the imaging system when a front area of a vehicle (a capturing area 350) is captured. The vehicle information acquisition device 320 transmits an instruction to the imaging system 300 or the imaging device 310. Such a configuration can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

Modified Embodiments

The present invention is not limited to the embodiments described above, and various modifications are possible.

For example, an example in which a part of the configuration of any of the embodiments is added to another embodiment or an example in which a part of the configuration of any of the embodiments is replaced with a part of the configuration of another embodiment is also one of the embodiments of the present invention.

Further, although the signal level of the output line 16 is limited to the range whose lower limit is the clip level set by the clip circuit 32 in the embodiments described above, the signal level of the output line 16 is limited to the range whose upper limit is the clip level set by the clip circuit 32. For example, when signal charge is positive charge, the potential of the floating diffusion portion FD increases due to transfer of signal charge to the floating diffusion portion FD, and the potential of the output line 16 increases. In such a case, it is effective to limit the signal level of the output line 16 to the range whose upper limit is the clip level set by the clip circuit 32.

Further, the drive method illustrated in the first embodiment described above can be applied to the configuration of the second or third embodiment. Similarly, the drive method illustrated in the second embodiment described above can be applied to the configuration of the third embodiment.

Further, in the above fourth embodiment, although the example in which signal readout is performed in the order of the first noise signal, the first light detection signal, the second light detection signal, and the second noise signal in the same manner as in the first embodiment has been described, signal readout may be performed in the same order as in the second or third embodiment. In such a case, a sample-hold capacitor that holds a signal output from the output line 16 may be arranged on the upstream side of the column readout circuit unit if necessary.

Further, the pixel circuit illustrated in FIG. 2 is an example, and the circuit configuration of the pixel 12 is not limited thereto. For example, a single pixel 12 may include a plurality of photoelectric converters PD or may further include a holding portion that can hold charge in addition to the photoelectric converter PD and the floating diffusion portion FD.

Further, although the devices intended for acquisition of an image, that is, imaging devices have been illustrated as examples in the above first to fourth embodiments, an application example of the present invention is not necessarily limited to imaging devices. For example, in a case of application to a device mainly intended for ranging as described in the above sixth embodiment, it is not necessarily required to output an image. In such a case, it can be said that such a device is a photoelectric conversion device that converts optical information into a predetermined electrical signal. The imaging device is one of the photoelectric conversion devices.

Further, the imaging system illustrated in the above fifth or sixth embodiment is an example of an imaging system to which the imaging device of the present invention may be applied, and an imaging system to which the imaging device of the present invention can be applied is not limited to the configuration illustrated in FIG. 13 and FIG. 14A.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-020641, filed Feb. 10, 2020 which is hereby incorporated by reference herein in its entirety.

What is claimed is:
1. An imaging device comprising:
a plurality of pixels each including a photoelectric converter that generates charge by photoelectric conversion, a holding portion that holds charge transferred from the photoelectric converter, and an output unit that outputs a pixel signal based on charge held by the holding portion;
an output line that is connected to the plurality of pixels and to which signals from the plurality of pixels are output;
a clip circuit that limits a signal level of the output line to a range whose upper limit or lower limit is a predetermined clip level; and
a column readout circuit that amplifies a signal of the output line, wherein in response to one pixel signal output from the pixel, the column readout circuit outputs a first signal that is obtained by amplifying the one pixel signal at a first amplification factor and a second signal that is obtained by amplifying the one pixel signal at a second amplification factor that is different from the first amplification factor, and wherein the clip circuit limits a signal level of the output line to a first clip level in a first period in which the pixel signal is amplified at the first amplification factor and limits a signal level of the output line to a second clip level that is different from the first clip level in a second period in which the pixel signal is amplified at the second amplification factor, wherein the first amplification factor is larger than the second amplification factor, and wherein a range of a signal level of the output line limited by the first clip level is narrower than a range of a signal level of the output line limited by the second clip level.

2. The imaging device according to claim 1,
wherein each of the plurality of pixels further includes a reset transistor that resets a potential of the holding portion, and
wherein a signal level of a control signal for controlling the reset transistor to be an off-state is the same for the first period and the second period.

3. The imaging device according to claim 1,
wherein each of the plurality of pixels further outputs a noise signal based on a reset potential of the holding portion,
wherein in response to a noise signal output from the pixel, the column readout circuit further outputs a third signal amplified at the first amplification factor and a fourth signal amplified at the second amplification factor, and
wherein the clip circuit limits a signal level of the output line to the first clip level in a third period in which the noise signal is amplified at the first amplification factor and limits a signal level of the output line to the second clip level in a fourth period in which the noise signal is amplified at the second amplification factor.

4. The imaging device according to claim 3, wherein the column readout circuit outputs signals in order of the third signal, the first signal, the second signal, and the fourth signal.

5. The imaging device according to claim 3, wherein the column readout circuit outputs signals in order of the third signal, the fourth signal, the first signal, and the second signal.

6. The imaging device according to claim 3, wherein the column readout circuit outputs signals in order of the third signal, the first signal, the fourth signal, and the second signal.

7. The imaging device according to claim 5, wherein the third signal and the fourth signal are generated by amplifying the same noise signal output to the output line.

8. The imaging device according to claim 6, wherein the third signal and the fourth signal are generated by amplifying the same noise signal output to the output line.

9. The imaging device according to claim 1, wherein the column readout circuit includes
an amplifier,
a first capacitor connected between an input node and an output node of the amplifier via a first switch,
a second capacitor connected between the input node and the output node via a second switch,
a third switch connected between the input node and the output node,
a third capacitor connected between the output line and the input node via a fourth switch,
a fourth capacitor connected between the output line and the input node via a fifth switch, and
a sixth switch connected between a first electrode and a second electrode of the fourth capacitor.

10. An imaging device comprising:
a plurality of pixels each including a photoelectric converter that generates charge by photoelectric conversion, a holding portion that holds charge transferred from the photoelectric converter, and an output unit that outputs a pixel signal based on charge held by the holding portion;
an output line that is connected to the plurality of pixels and to which signals from the plurality of pixels are output;
a clip circuit that limits a signal level of the output line to a range whose upper limit or lower limit is a predetermined clip level; and
an analog-to-digital conversion unit that performs analog-to-digital conversion on a signal of the output line,
wherein in response to one pixel signal output from the pixel, the analog-to-digital conversion unit outputs a first signal obtained by performing analog-to-digital conversion on the one pixel signal at a first conversion gain and a second signal obtained by performing analog-to-digital conversion on the one pixel signal at a second conversion gain that is different from the first conversion gain,
wherein the clip circuit limits a signal level of the output line to a first clip level in a first period in which the pixel signal is converted by analog-to-digital conversion into the first signal and a signal level of the output line to a second clip level that is different from the first clip level in a second period in which the pixel signal is converted by analog-to-digital conversion into the second signal,
wherein the first conversion gain is larger than the second conversion gain, and
wherein a range of a signal level of the output line limited by the first clip level is narrower than a range of a signal level of the output line limited by the second clip level.

11. The imaging device according to claim 10,
wherein each of the plurality of pixels further includes a reset transistor that resets a potential of the holding portion, and
wherein a signal level of a control signal for controlling the reset transistor to be an off-state is the same for the first period and the second period.

12. The imaging device according to claim 10,
wherein each of the plurality of pixels further outputs a noise signal based on a reset potential of the holding portion,
wherein in response to a noise signal output from the pixel, the analog-to-digital conversion unit outputs a third signal obtained by performing analog-to-digital conversion at the first conversion gain and a fourth signal obtained by performing analog-to-digital conversion at second conversion gain, and
wherein the clip circuit limits a signal level of the output line to the first clip level in a third period in which the noise signal is converted by performing analog-to-digital conversion into the third signal and a signal level of the output line to the second clip level in a fourth period in which the noise signal is converted by performing analog-to-digital conversion into the fourth signal.

13. An imaging system comprising:
the imaging device according to claim 1; and
a signal processing unit that processes a signal output from the imaging device.

14. A movable object comprising:
the imaging device according to claim 1;
a distance information acquisition unit that acquires distance information on a distance to an object, from a parallax image based on signals from the imaging device; and
a control unit that controls the movable object based on the distance information.

15. An imaging system comprising:
the imaging device according to claim 10; and
a signal processing unit that processes a signal output from the imaging device.

16. A movable object comprising:
the imaging device according to claim 10;
a distance information acquisition unit that acquires distance information on a distance to an object, from a parallax image based on signals from the imaging device; and
a control unit that controls the movable object based on the distance information.

17. The imaging device according to claim 1, wherein the column readout circuit is connected to the output unit.

18. The imaging device according to claim 1, wherein the column readout circuit amplifies the one pixel signal at the first amplification factor and the second amplification factor to output the first signal and the second signal.

19. The imaging device according to claim 1, wherein the clip circuit limits the signal level of the output line in accordance with an amplification factor set to the column readout circuit.

* * * * *